(12) United States Patent
Bruce et al.

(10) Patent No.: US 8,701,294 B2
(45) Date of Patent: Apr. 22, 2014

(54) CUTTING IMPLEMENT WITH INTERCHANGEABLE/REPLACEABLE BLADES

(75) Inventors: Ryan Bruce, Phoenix, AZ (US); Richard Constantine, Milford, CT (US); Yani Deros, Phoenix, AZ (US); Matthew Ibarra, Lakewood, CA (US); Man For Ma, N. T. (HK)

(73) Assignee: Acme United Corporation, Fairfield, CT (US)

( * ) Notice: Subject to any disclaimer, the term of this patent is extended or adjusted under 35 U.S.C. 154(b) by 1166 days.

(21) Appl. No.: 12/558,567

(22) Filed: Sep. 13, 2009

(65) Prior Publication Data

US 2011/0061249 A1    Mar. 17, 2011

(51) Int. Cl.
*B26B 13/00*    (2006.01)

(52) U.S. Cl.
USPC ................................ 30/236; 30/254; 30/261

(58) Field of Classification Search
USPC .................. 30/236, 254, 165, 341, 258–262, 30/244–253
See application file for complete search history.

(56) References Cited

U.S. PATENT DOCUMENTS

| | | | |
|---|---|---|---|
| 106,649 A | 8/1870 | Barnard et al. | |
| 107,577 A | 9/1870 | Will | |
| 194,659 A | 8/1877 | Disston et al. | |
| 476,459 A | 6/1892 | Hamann et al. | |
| 486,560 A | 11/1892 | Dinkel | |
| 588,794 A | 8/1897 | Granger | |
| 633,854 A | 9/1899 | Kuhn | |
| 838,504 A | 12/1906 | Hammond | |
| 2,072,140 A | 3/1937 | Smith | |
| 2,310,959 A | 2/1943 | James | |
| 2,333,740 A | 11/1943 | Rasmussen | |
| 2,607,114 A | 8/1952 | Keiser et al. | |
| 2,683,311 A | 7/1954 | Smith | |
| 2,745,177 A | 5/1956 | Kortick | |
| 2,798,404 A | 7/1957 | Schaefer et al. | |
| 2,913,080 A | 11/1959 | Louik et al. | |
| 3,772,783 A | 11/1973 | Averitt | |
| 4,120,088 A | 10/1978 | Phelps | |
| 4,209,901 A | 7/1980 | Hemingway | |
| 4,268,963 A | 5/1981 | Harrison | |
| 4,338,270 A | 7/1982 | Uffindell | |
| 4,340,990 A | 7/1982 | Seynhaeve | |
| 4,341,016 A | 7/1982 | Harrison et al. | |
| 4,364,150 A | 12/1982 | Remington | |
| 4,517,623 A | 5/1985 | Barner et al. | |
| 4,567,656 A | 2/1986 | Wallace et al. | |
| 4,575,940 A | 3/1986 | Wenzel | |
| 4,759,125 A | 7/1988 | Olaes | |
| 4,779,342 A * | 10/1988 | Kobayashi et al. | 30/250 |
| D305,495 S | 1/1990 | Carter | |
| 4,918,820 A | 4/1990 | Korb et al. | |
| 4,980,975 A | 1/1991 | Hodson | |
| 5,060,387 A | 10/1991 | Doucette | |
| D336,222 S | 6/1993 | Wensley et al. | |
| 5,243,762 A | 9/1993 | Orthey | |
| D342,652 S | 12/1993 | Wensley et al. | |

(Continued)

*Primary Examiner* — Omar Flores Sanchez
(74) *Attorney, Agent, or Firm* — Marian J. Furst

(57) ABSTRACT

A cutting implement with blades that can be replaced or interchanged without using tools. The cutting implement has shock absorbing handles and may also have at least one bumper to reduce the forces transmitted to the user's hands and arms. The cutting implement may be a saw, pruners, lopper, grass shears, hedge shears, or garden shears.

52 Claims, 30 Drawing Sheets

(56) References Cited

U.S. PATENT DOCUMENTS

| | | |
|---|---|---|
| 5,299,355 A | 4/1994 | Boda et al. |
| 5,483,747 A | 1/1996 | Thompson et al. |
| 5,495,670 A | 3/1996 | Quinn |
| 5,537,688 A | 7/1996 | Reynolds et al. |
| 5,551,157 A | 9/1996 | Wu |
| D374,597 S | 10/1996 | Birkholz et al. |
| 5,570,510 A | 11/1996 | Linden |
| 5,585,578 A | 12/1996 | Shimotori |
| 5,661,908 A | 9/1997 | Chen |
| 5,697,159 A | 12/1997 | Linden |
| 5,711,054 A | 1/1998 | Salice |
| D393,401 S | 4/1998 | Clivio |
| 5,765,289 A | 6/1998 | Schulz et al. |
| D399,721 S | 10/1998 | Torre |
| 5,966,816 A | 10/1999 | Roberson |
| D422,856 S | 4/2000 | Wu |
| D426,755 S | 6/2000 | Wu |
| 6,127,010 A | 10/2000 | Rudy |
| D434,286 S | 11/2000 | Lin |
| 6,170,362 B1 | 1/2001 | Chen |
| 6,250,184 B1 | 6/2001 | Chang |
| 6,338,290 B1 | 1/2002 | Lin |
| 6,339,884 B1 | 1/2002 | Liu |
| D453,461 S | 2/2002 | Chen |
| D459,168 S | 6/2002 | Meyerratken |
| 6,418,626 B1 | 7/2002 | Jang |
| 6,428,865 B1 | 8/2002 | Huang |
| D462,586 S | 9/2002 | Halpern et al. |
| D463,227 S | 9/2002 | Choi |
| 6,502,311 B1 * | 1/2003 | Khachatoorian et al. ....... 30/162 |
| 6,591,456 B2 | 7/2003 | DeLuca et al. |
| 6,752,054 B2 * | 6/2004 | Knight ............................. 83/13 |
| 6,829,828 B1 | 12/2004 | Cech et al. |
| 6,865,816 B1 | 3/2005 | Zajdel |
| D509,115 S | 9/2005 | Wu |
| 7,032,941 B2 | 4/2006 | Heneveld |
| D519,818 S | 5/2006 | Knopow et al. |
| 7,093,367 B1 | 8/2006 | Huang |
| D527,975 S | 9/2006 | Okada |
| 7,186,067 B2 | 3/2007 | Leblanc |
| D545,646 S * | 7/2007 | Shan ................................ D8/5 |
| 7,363,685 B2 | 4/2008 | Walker et al. |
| D571,182 S | 6/2008 | Whitehead |
| D574,210 S | 8/2008 | Packard et al. |
| D576,011 S | 9/2008 | Lipscomb et al. |
| D585,251 S | 1/2009 | Lee et al. |
| 7,516,550 B2 | 4/2009 | Hagan et al. |
| 8,109,003 B2 * | 2/2012 | Liu ................................ 30/236 |
| 2003/0070259 A1 * | 4/2003 | Brown et al. ................... 16/436 |
| 2003/0121388 A1 | 7/2003 | Wheeler et al. |
| 2004/0000058 A1 | 1/2004 | Shyr |
| 2005/0188468 A1 | 9/2005 | Crawford |
| 2006/0185172 A1 | 8/2006 | Marshall et al. |
| 2008/0295339 A1 | 12/2008 | Lipscomb et al. |
| 2009/0090010 A1 | 4/2009 | Lin |

\* cited by examiner

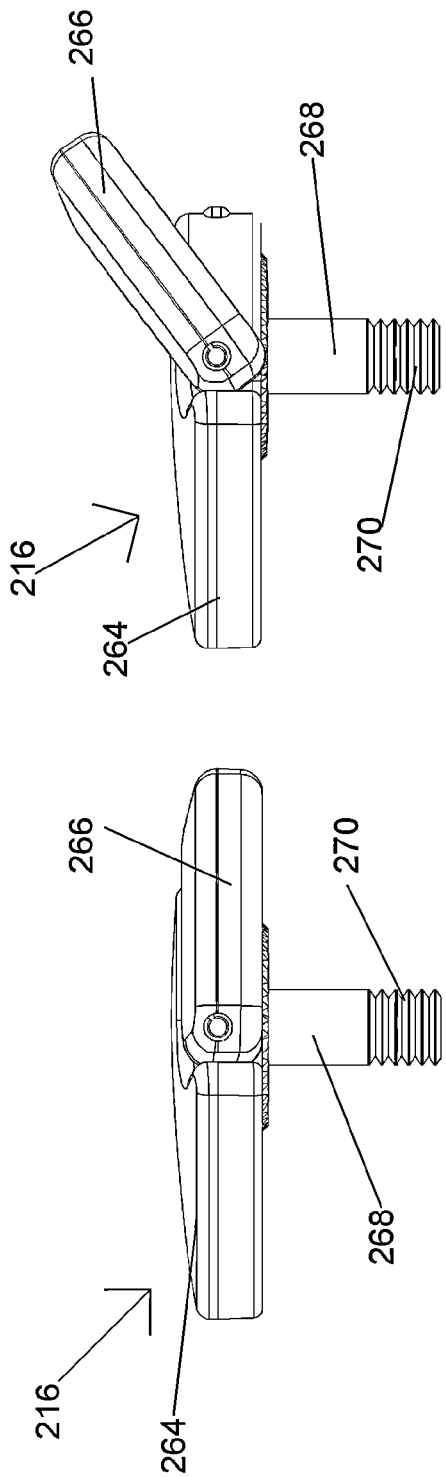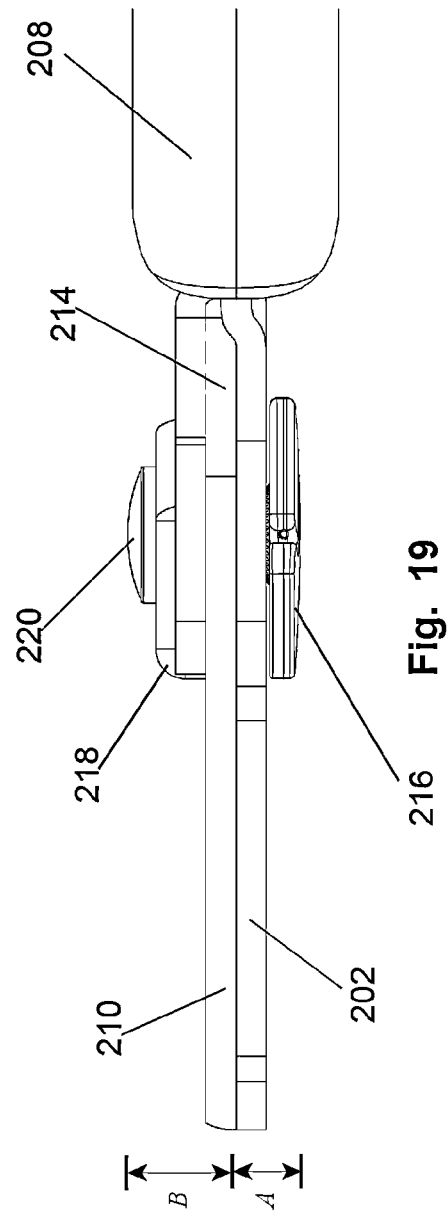

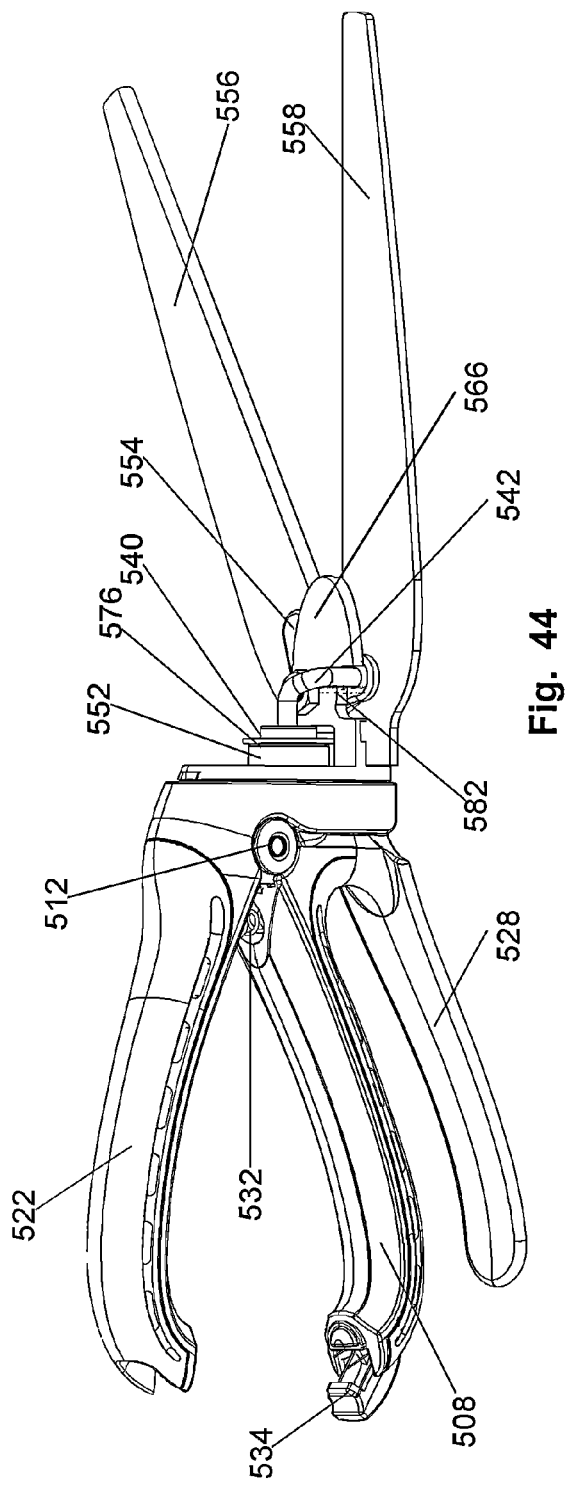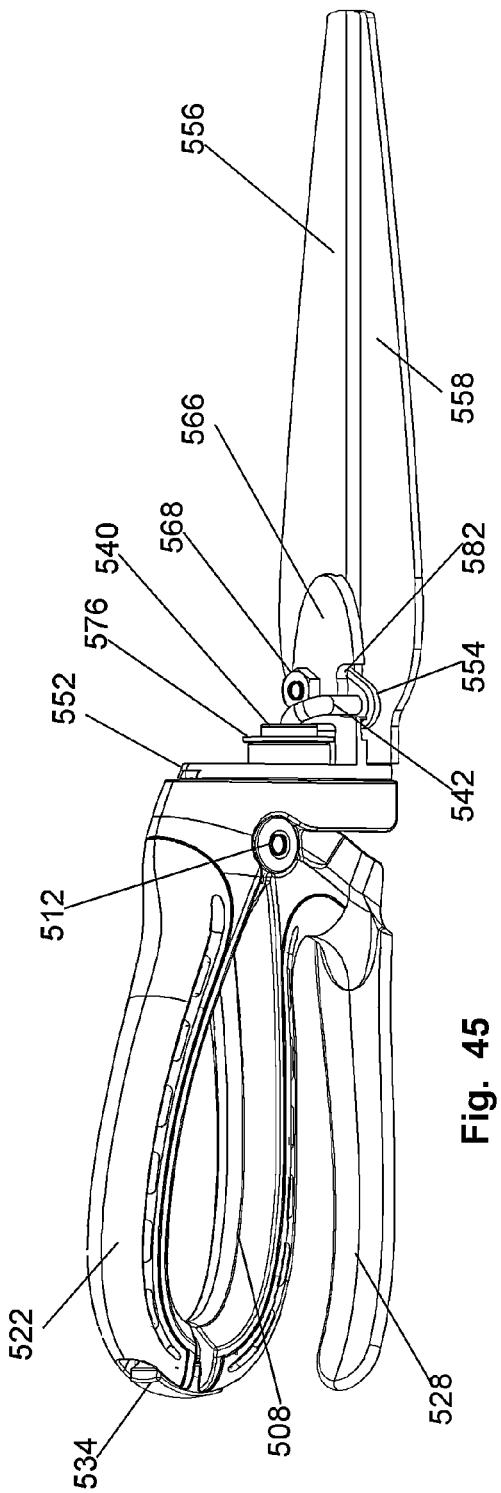

CUTTING IMPLEMENT WITH INTERCHANGEABLE/REPLACEABLE BLADES

FIELD OF THE INVENTION

The present invention relates generally to cutting implement, and more specifically to a cutting implement having blades that are interchangeable and/or replaceable without tools.

BACKGROUND OF THE INVENTION

A number of scissors and shears have been proposed with interchangeable blades, with several motivations for providing interchangeable blades, including reducing manufacturing costs by forming the handles from a relatively inexpensive, somewhat softer material than the blades, which are desirably formed from a harder material, such as steel, that can provide a sharp and relatively durable edge.

Many lawn and garden cutting implements have been proposed with interchangeable blades have two blades sandwiched between extensions of the handles, with a pivot bolt passing through the first handle extension, first blade, second blade, and second handle extension. A nut adjacent the outer surface of the second handle extension is threadably engaged with the shank of the bolt to hold the handles and blades together. Because the pivot bolt/nut assembly passes through multiple metal plates (for example, ends of the two handles and two blades), the thickness of the cutting implements through the pivot bolt and nut is significantly greater than the thickness through the pivot bolt of conventional shears, where the bolt only passes through two metal plates. The increased thickness displaces the plane along which the blades meet away from the outermost points of the pivot bolt and nuts, increasing the thickness of the cutting portion of the shears so they cannot cut twigs and branches close obstructing parts of a plant. Such obstructing parts may be the main stems or side branches of the plant.

Another disadvantage of many known garden shears with interchangeable blades is that tools are required to remove and replace blades. For example, screwdrivers, Allen keys, or wrenches must be used with either the bolt, the nut, or both.

Shears have been patented that at least apparently do not need tools for dissasembly and reassembly of the handles and blades.

- U.S. Pat. No. 4,56,656 to Wallace et al. describes shears where a coin or other bladed implement is needed to remove the bolt.
- U.S. Pat. No. 4,980,975 to Hodson describes secateurs with a screw head on one side of the pivot area. The screw head has a rib that extends outward and can be gripped by a user's fingers. The rib must extend outward a significant distance to allow sufficient grip to tighten the screw to the bolt and remove a tightened screw from the bolt.
- U.S. Pat. No. D422,856 and D426,755 to Wu describe anvil and bypass pruners, respectively. There is a knurled knob that may be either the head of a bolt or a nut on one side of the pivot area and a corresponding nut or bolt head on the other side of the pivot area.
- U.S. Pat. No. D459,168 S describes shears having a feature with a modified triangular shape that could be a washer or a part of a nut or bolt.

All of these have structures that protrude outward on both sides of the pivot area, increasing the distance between the outermost point of the pivot and the plane along which the blades cut. Further, the Wallace et al. and Hodson shears have numerous small internal parts, complicating the processes of disassembly and reassembly.

It would be desirable to provide cutting implements with interchangeable blades that can be interchanged without the need for any tools and with a minimal number of parts to be disassembled and reassembled when the blades are changed. It would also be desirable to provide garden shears, including hedge shears, grass shears, loppers, and pruners, with a narrower fulcrum than previous garden shears with interchangeable blades, such that the cutting plane is close to the outermost surface of the fulcrum area. It would also be desirable to provide a pruning saw with an interchangeable blade that can be replaced easily and safely without tools.

SUMMARY OF THE INVENTION

To achieve the foregoing and other objects and in accordance with the purpose of the present invention broadly described herein, one embodiment of this invention comprises a cutting implement. The cutting implement comprises at least one handle portion with at least one cushioned grip secured onto the handle portion. The grip is formed from a resilient material and at least partially encloses cells containing a softer material. The cutting implement also includes at least one removable and replaceable blade. In addition, means for retaining and releasing the blade is pivotable with application of force by a user's fingers and grippable by a user's fingers for removing and replacing the blade without tools. The means for retaining has a narrow, smooth profile substantially parallel to the blade.

Preferably, the grip is formed from a material selected from thermoplastic elastomers, silicone, and combinations thereof, and the softer material in the cells comprises a material selected from clear elastomers, gels, air, and combinations thereof.

Another embodiment of the present invention comprises a saw. The saw includes a handle having a longitudinal axial plane; a substantially planar blade with a non-cutting portion formed for retention along the axial plane within the handle portion and a hole passing through the non-cutting portion; a paddle attached to one side of the handle in an orientation substantially parallel to the axial plane, the paddle attached to the handle portion via at least one hinge and rotatable about the hinge between a lockable position for retaining the blade and a release position wherein the blade is released and removable from the handle, one side of the handle in an orientation substantially parallel to the axial plane; and a locking pin attached to the paddle. The paddle urges the locking pin into the opening in the blade when in the lockable position, and the paddle pulls the locking pin out of the opening in the blade when in the release position. The paddle and locking pin comprise means for retaining and releasing the blade to allow removal and replacement of the blade without tools. The saw may further comprise a lock mechanism engageable with the paddle and operative to lock the paddle in the lockable position.

Yet another embodiment of the present invention comprises a cutting implement. The implement includes a first removable and replaceable blade having interlockable key features; a second removable and replaceable blade that cooperates with the first blade with a cutting plane defined between the two blades, the second blade having interlockable key features; a first handle, having a first blade securing portion at one end, the first blade securing portion having an interior surface adjacent the first blade and an exterior surface facing away from the first blade, the first blade securing portion having interlockable key features that complement the key features on the first blade; a second handle, having a second blade securing portion at one end, the second blade securing portion having an interior surface adjacent the second blade and an exterior surface facing away from the first blade, the second blade securing portion having interlockable key features that complement the key features on the first blade; and fulcrum means extending through the first blade securing portion, the first blade, the second blade, and the second blade securing portion. The fulcrum means has a narrow, smooth profile substantially parallel to the exterior surface of the first blade securing portion and a bail handle having an exterior surface and rotatable about a hinge between a first position with its exterior surface substantially parallel to the exterior surface of the first blade retaining portion and a second position with its exterior surface substantially perpendicular to the exterior surface of the first blade securing portion, the bail handle sized for gripping between a user's fingers for removing and replacing the blade without tools. The fulcrum means also has a second exterior surface substantially flush with the exterior surface of the second blade securing portion. The interlocking key features of the first blade and the first blade securing portion lock the first blade to the first handle for rotational motion about the fulcrum means, and the interlocking key features of the second blade and the second blade securing portion lock the second blade to the fulcrum means.

In one alternative, the fulcrum means comprises a nut and a bolt, with at least one of the bolt and the nut, when mated to retain the handle ends and blades, passes through holes extending through the blade retaining portions and blades. In this case, the fulcrum means has a length defined between its exterior surfaces and the cutting plane divides the length into two unequal distances.

In another alternative, the fulcrum means comprises a nut and a bolt. The bolt comprises a head having a handle grippable by a user's fingers for rotational motion selected from screwing the bolt into the nut and unscrewing the bolt from the nut; a threaded bolt shank mateable with the nut; and a cylindrical portion between the head and the shank. The nut comprises a head having an exterior surface substantially flush with the exterior surface of the second blade securing portion; an internally threaded nut shank having a first portion with a polygonal cross section and a second portion with a round cross section. In this case, the second handle portion and the second blade include polygonal through holes dimensioned to lock around the polygonal portion of the nut shank, and the first handle portion and the first blade include round through holes dimensioned to rotate about the cylindrical portion of the nut shank.

Still another embodiment of the invention comprises a cutting implement with a first blade integral with a first handle. The first blade has an exterior surface and an interior surface. A second blade is removable and replaceable, and the second blade cooperates with the first blade, with a cutting plane defined between the second blade and the interior surface of the first blade. The second blade has interlockable key features. A second handle has a second blade securing portion at one end, and the second blade securing portion has an interior surface adjacent the second blade and an exterior surface facing away from the second blade. The second blade securing portion also has interlockable key features aligned with the key features on the second blade. A fulcrum means extends through holes in the first blade, the second blade, and the second blade securing portion. A lock washer has prongs extending from the exterior surface of the blade securing into the aligned interlockable key features of the second blade securing portion and the second blade. The fulcrum means has narrow, smooth profiles substantially parallel to the exterior surface of the first blade and the exterior surface of the second blade securing portion. Also, the fulcrum means comprises a bail handle having an exterior surface and rotatable about a hinge between a first position with its exterior surface substantially parallel to the exterior surface of the first blade retaining portion and a second position with its exterior surface substantially perpendicular to the exterior surface of the first blade securing portion. The bail handle is sized for gripping between a user's fingers for removing and replacing the blade without tools. One of the blades may include a notch for cutting objects selected from wires and ties.

A further embodiment of the present invention is a cutting implement selected from grass shears and hedge shears. The implement comprises a handle assembly and a blade assembly. The handle assembly includes a fixed handle; a movable handle joined to the fixed handle at a first pivot joint; a bent rod having a first threaded end and a second end; and a nut within the movable handle engageable with the first threaded end of the rod. The movable handle is rotatable in a first plane about the first pivot joint relative to the fixed handle. The blade assembly comprises a blade chassis having an integral internally threaded boss; a key blade adjacent to the blade chassis; a movable blade locked to the key blade; a fixed blade locked to the chassis; and a bolt. The bolt has a head with a narrow, smooth profile substantially parallel to an exterior surface of the movable blade; a shank fixed to and extending from the head and passing through openings in the blades, the shank having a threaded end mated with the boss of the chassis; and a bail handle rotatable with application of force by a user's fingers and grippable by a user's fingers for removing and replacing the bolt from the nut to remove and replace the movable and fixed blades without tools. The rod extends from the handle assembly and engages with the key blade to rotate the movable blade about the second pivot joint when the movable handle is rotated about the first pivot joint. The bolt and the threaded boss form the second pivot joint for motion of the movable blade relative to the fixed blade with a cutting plane defined between the movable and fixed blades. The bolt provides a fulcrum for relative rotational motion of the movable blade relative to the fixed blade. The blade chassis is joined to the handle assembly at a third pivot joint, with the blade assembly rotatable about the third pivot joint to change the angle between the first plane and the cutting plane. The shears may further comprise a flexible finger security device that is removably attached to the movable handle. In addition the shears may comprise a nose cover mounted over the chassis and the rod. With respect to the third pivot joint, the fixed handle may comprise a substantially planar face adjacent the blade chassis, with a series of depressions spaced along an arc in the handle face, and the blade chassis may comprise a substantially planar face positioned against the handle face, with a projection that interfaces with the depressions as the blade chassis rotates relative to the handle assembly about the third pivot joint.

Yet another embodiment of the present invention comprises a fulcrum fastening system for a cutting implement having interchangeable and replaceable blades. The fastening system comprises a bolt having a threaded shank; a head integral with the shank; a head cover mounted onto the head, the head cover having a smooth exterior surface; and a bail hingedly attached to the head cover. The bail has a surface and is positionable between a first position with the bail surface substantially flush with the exterior surface of the head cover and a gripping position where the bail surface is substantially perpendicular to the exterior surface. The bail is grippable between a user's fingers for rotation of the bolt about an axis extending longitudinally through the shank.

The fastening system may further comprise a hinge pin extending through holes in the bail and the head cover to join the bail to the head cover. The hinge pin may also extend through a hole in the head to join the head cover and bail to the head. Also, the fastening system may further comprise a nut. In this case, the nut has a head with a smooth exterior surface and an internally threaded nut shank having a first portion with a polygonal cross section and a second portion with a round cross section. The internally threaded nut shank is matable with the threaded end of the bolt shank. The polygonal portion of the nut shank is lockable with a handle and blade of the cutting implement, and the round portion of the nut shank provides a fulcrum for rotation of a second handle and blade of the cutting implement. Preferably, the bolt head cover and the nut head are formed to provide smooth exterior surfaces when the nut is joined to the bolt.

Still another embodiment of the present invention comprises a connection system for releasably retaining a blade in a cutting implement. The blade is formed for retention in a handle and includes a through hole. The connection system comprises a paddle attached to one side of the handle via at least one hinge and pivotable about the hinge between a lockable position against the handle for retaining the blade and a release position for releasing and removing the blade. The paddle has an internal surface facing toward the blade and an external surface facing away from the blade. In addition, the system comprises a locking pin attached via a hinge to the internal surface of the paddle. The paddle urges the locking pin into the opening in the blade when in the lockable position, and the pin is pulled out of the opening in the blade when in the paddle is in the release position. The paddle and locking pin comprise means for retaining and releasing the blade to allow removal and replacement of the blade without tools. The connection system may further comprise a lock mechanism for locking the paddle in the lockable position to prevent release of the blade.

Still a further embodiment of the present invention comprises an interlocking blade and handle system for a cutting implement with interchangeable or replaceable blades. The system includes a removable and replaceable blade having interlockable key features. The system also includes a handle having a blade securing portion at one end. The blade securing portion has an interior surface adjacent the blade and an exterior surface facing away from the blade. The blade securing portion has interlockable key features that complement the key features on the blade. The interlocking key features of the blade and the blade securing portion lock the blade to the handle and prevent relative rotational motion.

Another embodiment of the present invention comprises a thickness and wear gauge for a cutting implement having a first blade secured to a first handle and a second blade secured to a second handle, with the blade and handle combinations pivotable about a fulcrum between a closed position and an open position. The gauge comprises projections extending toward each other from the handles and defining a rounded gap between the projections when the handles are in the closed position, and the gap has a diameter. The cutting implement is designed to cut objects having object diameters substantially equal to or less than the gap diameter with the handles in the closed position when the cutting implement is in a first state of wear. The cutting implement is in a second state of wear sufficient to require blade replacement or sharpening when the cutting implement cannot cut an object having a diameter substantially equal to the gap diameter.

Yet another embodiment of the present invention comprises a grip for a cutting implement with at least one handle portion. The grip comprises a resilient molded material mountable onto the handle portion. The material at least partially encloses cells containing a softer material. The resilient material is selected from thermoplastic elastomers, silicone, and combinations thereof. The softer material in the cells comprises a material selected from clear elastomers, gels, air, and combinations thereof.

BRIEF DESCRIPTION OF THE DRAWINGS

These and other features, aspects, and advantages of the present invention will become better understood with reference to the following description, appended claims, and accompanying drawings, where:

FIG. 17 is a side view of the D-ring fastener for connecting the handle and blades of the loppers of FIG. 13;

FIG. 18 is a side view of the D-ring fastener of FIG. 17, with the bail partially raised for use;

FIG. 19 is a top view of the blades, first blade support, and a portion of the second handle of the loppers of FIG. 13;

FIG. 44 is a perspective view of the shears of FIG. 36 in an open position with the nose cover removed;

FIG. 45 is a perspective view of the shears of FIG. 36 in a closed position with the nose cover removed;

DESCRIPTION OF THE PREFERRED EMBODIMENTS

Figure 1:
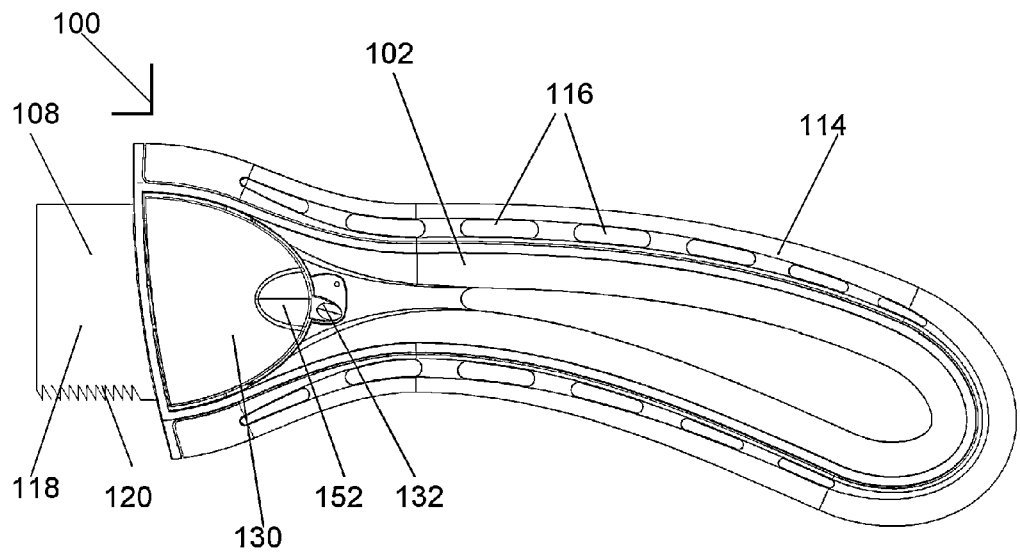
FIG. 1 is a left side view of a saw in accordance with the present invention.
Figure 2:
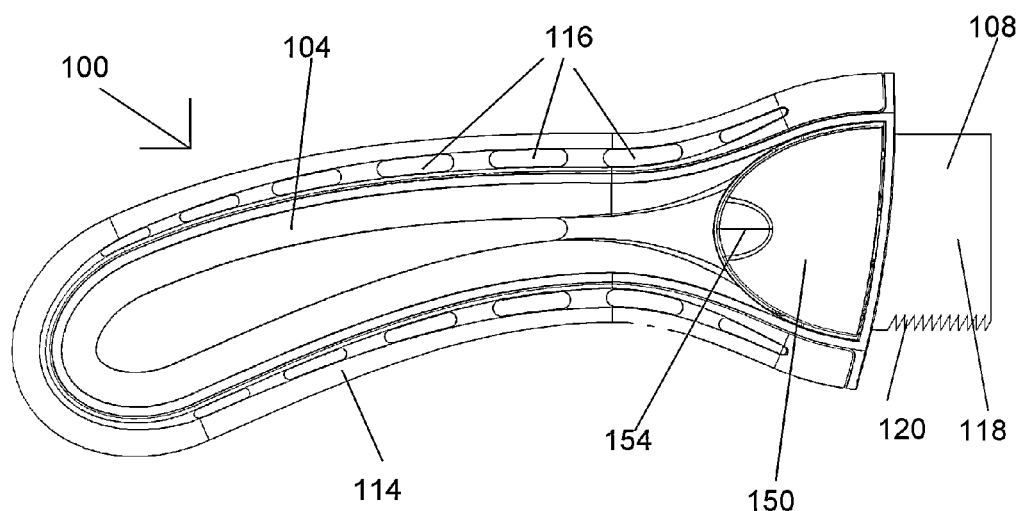
FIG. 2 is a right side view of the saw of FIG. 1.
Figure 3:
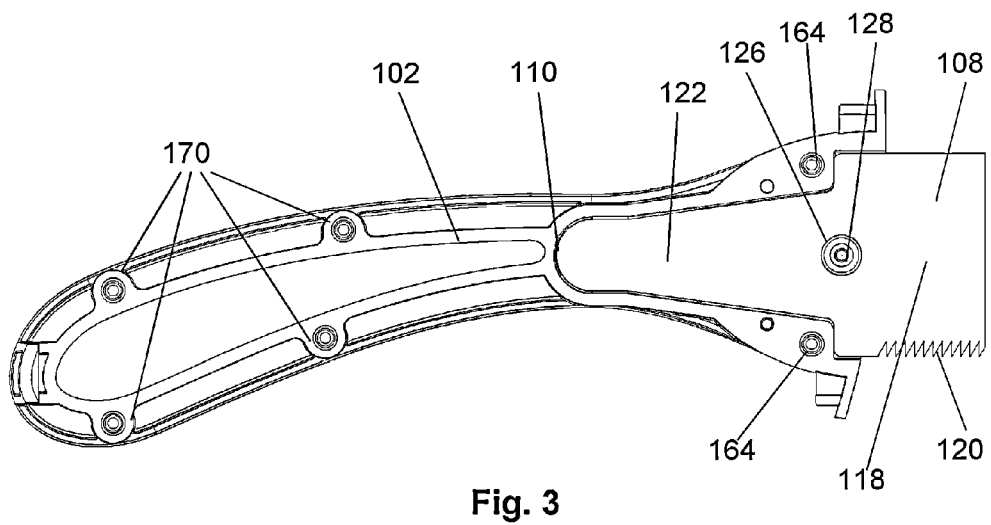
FIG. 3 is a side view of the interior of one handle portion and blade of the saw of FIG. 1.
Figure 4:
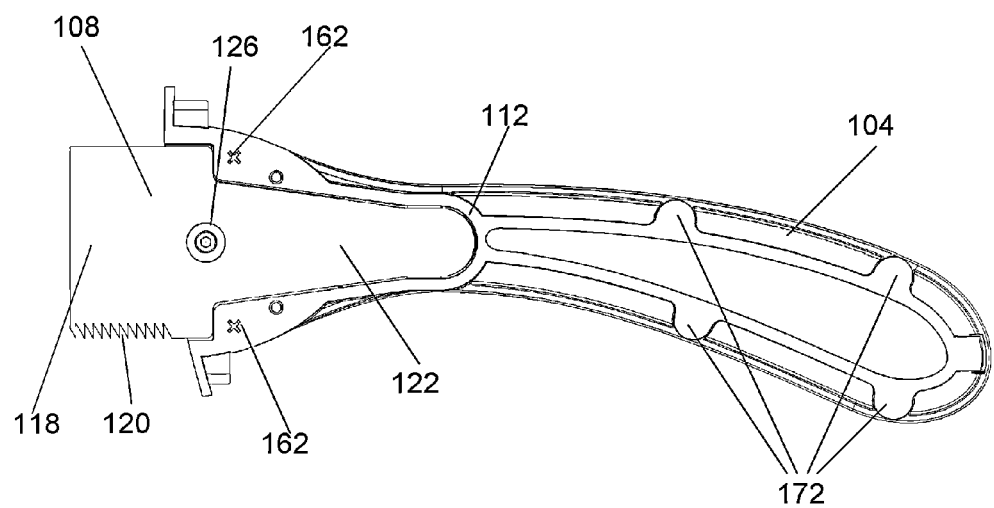
FIG. 4 is a side view of a part of one portion of the handle of the saw of FIG. 1 with the grip removed, showing the blade release mechanism in a position to engage the blade.
Figure 5:
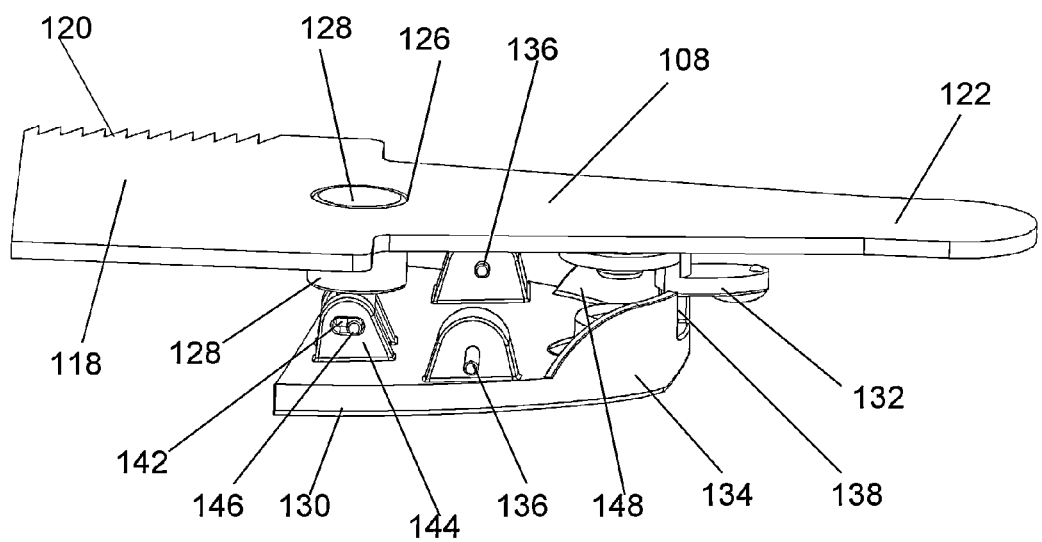
FIG. 5 is a side view of the part of the saw of FIG. 4, showing the blade release mechanism in a position to release the blade.

Various embodiments of the present invention comprise cutting implements, including saws, pruners, loppers, and grass shears, hedge shears, and garden shears. The cutting implements have blades that can be replaced or interchanged without using tools. Shock absorbing handles and bumpers reduce the impact forces transmitted to the user's hands and arms, allowing the user to work for a longer time while reducing fatigue and lessening the likelihood of injury. In the following discussion, terms that indicate directions or sides of an implement or component, such as "left," "right," "upper," and "lower" refer to the orientations shown in the drawings for clarity in the discussion of the cutting implements. The cutting implements can be rotated and used in any orientation.

Saw

One embodiment of the present invention comprises a pruning saw 100 with interchangeable and replaceable blades. Referring to FIGS. 1-9, saw 100 has two handle portions 102 and 104 that mate along a plane 106 in which they sandwich the non-cutting portion of a blade 108. Alternatively, a single handle could be formed with a slot to receive the non-cutting portion of blade 108. Shoulders 110 and 112 are formed on the internal surfaces of handle portions 102 and 104, respectively, hold the non-cutting portion of the blade, as discussed below. An elastomeric cushioned grip 114 covers the outer edges of handle portions 102 and 104, with cells 116 retained within the grip 114. Cells 116 may be through holes, or they may comprise closed cells filled with air, gel, or another resilient material that is softer than the grip 114.

Blade 108 has a cutting end 118, preferably with serrations along at least one edge 120, and a non-cutting end 122 that is shaped and sized for retention without excessive play in slot 124 between the ends of handle portions 102 and 104. Blade 108 also has an opening 126 through which a connection pin 128 extends to retain the blade in the saw.

Handle portion 102 includes a connection paddle 130 for quick and easy blade removal and replacement. Connection paddle 132 is pivotable between a locked position in which paddle 130 is prevented from releasing the saw blade 108, and an unlocked position that allows the end 134 of paddle 130 closest to the handle to be depressed and rotated about pins 136, with notch 138 surrounding connection paddle 132. When the end 134 of paddle 130 is depressed, connection pin 128 is pulled out of opening 126 in blade 108, allowing blade 108 to be pulled out of its sandwiched position between the handles. Slots 142 in pin retaining brackets 144 of paddle 130 allow pivot pins 146 on connection pin 128 to move laterally and maintain the central axis of connection pin 128 perpendicular to the plane of blade 108 as connection pin 128 moves out of opening 126. A spring 148 urges paddle end 134 outward so that connection pin 128 engages the blade. Handle portion 104 includes an inactive paddle 150 that does not move or rotate relative to the handle portion or blade 108. Each of handle portions 102 and 104 preferably has a depressed area 152 and 154, respectively, to aid in applying finger pressure to release the blade (shown in FIGS. 1 and 2). FIG. 5a shows the saw with handle portion 102 and grip 114 removed and with paddle 130 in the locked position, with connection pin 128 in opening 126 to retain blade 108. FIG. 5b shows the paddle 108 in the open position, with spring 148 compressed and connection pin 128 removed from opening 126, allowing blade 108 to be removed from the handle portions 102 and 104.

Figure 8:
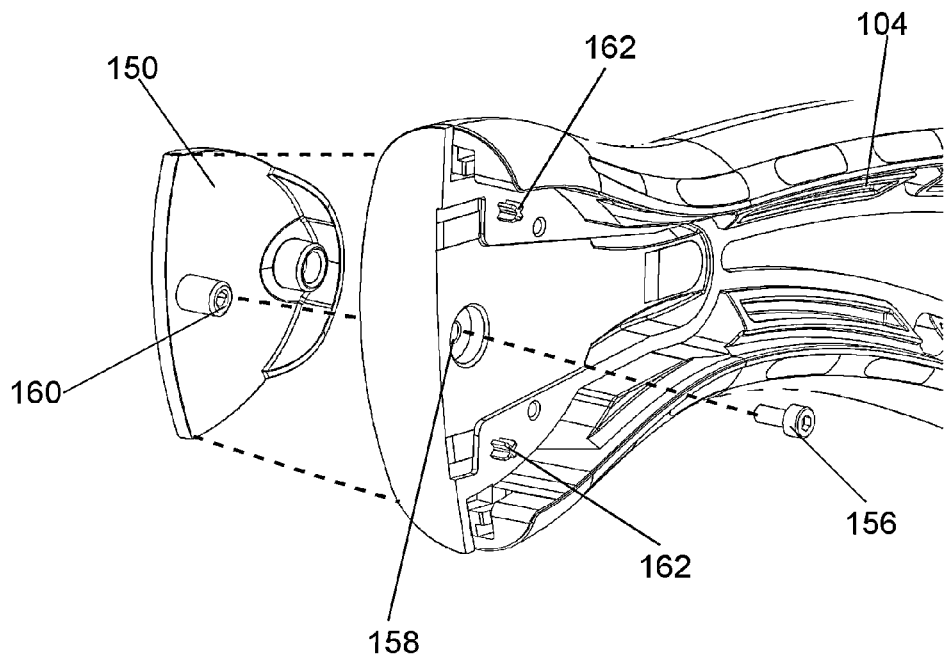
FIG. 8 is an exploded perspective view of a part of the handle portion of FIG. 2.
Figure 6:
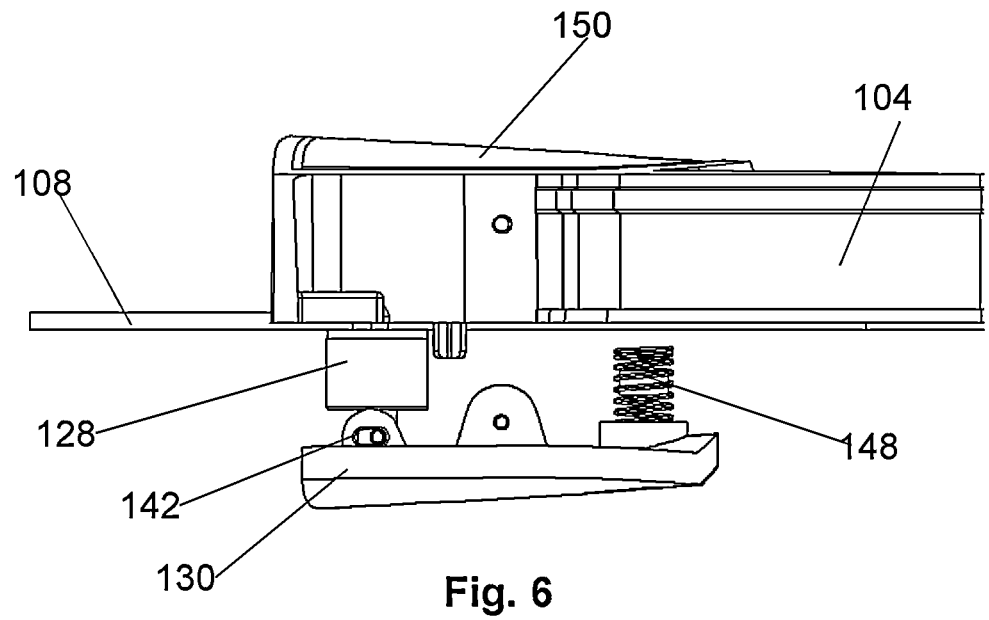
FIG. 6 is a side view of the interior of the other handle portion and blade of the saw of FIG. 1.
Figure 7:
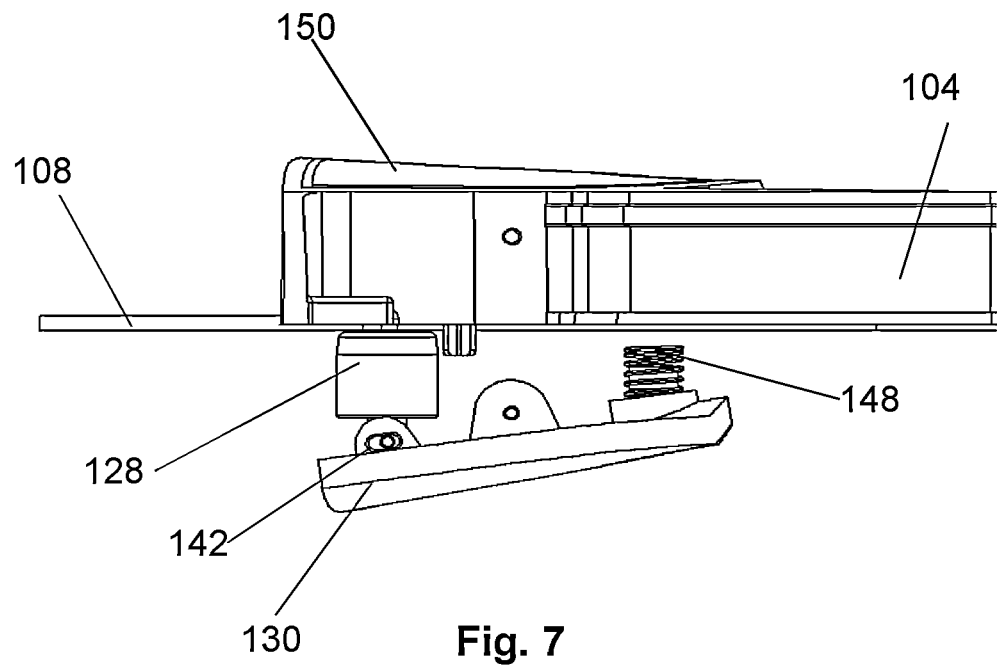
FIG. 7 is a perspective view showing the blade and connection mechanism of the saw of FIG. 1.
Figure 9:
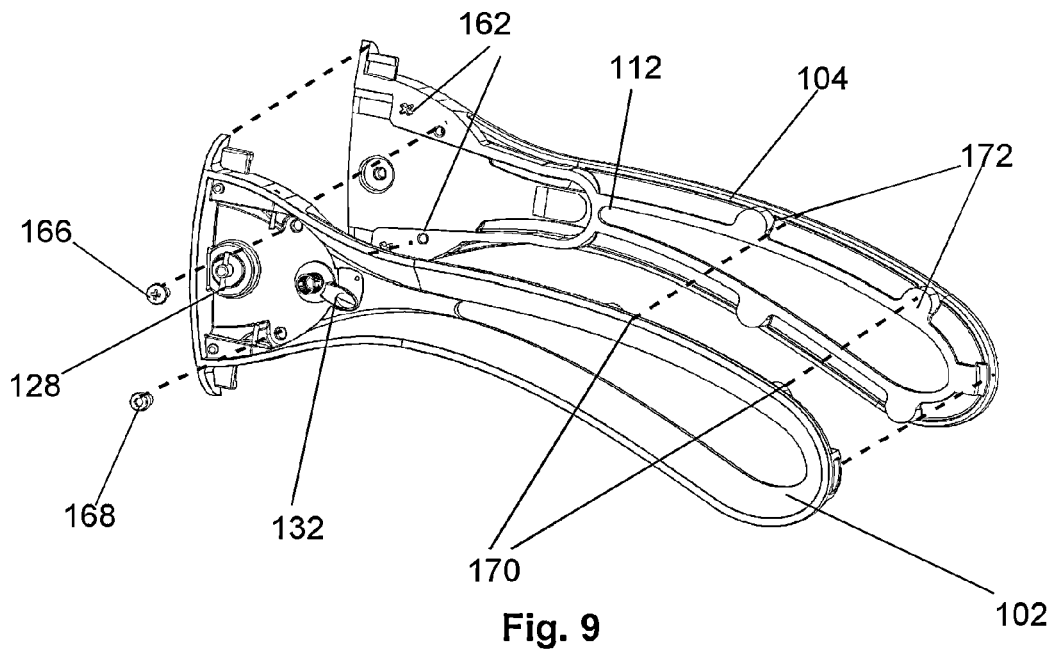
FIG. 9 is an exploded perspective view of the handle portions of the saw of FIG. 1.
Figure 10:
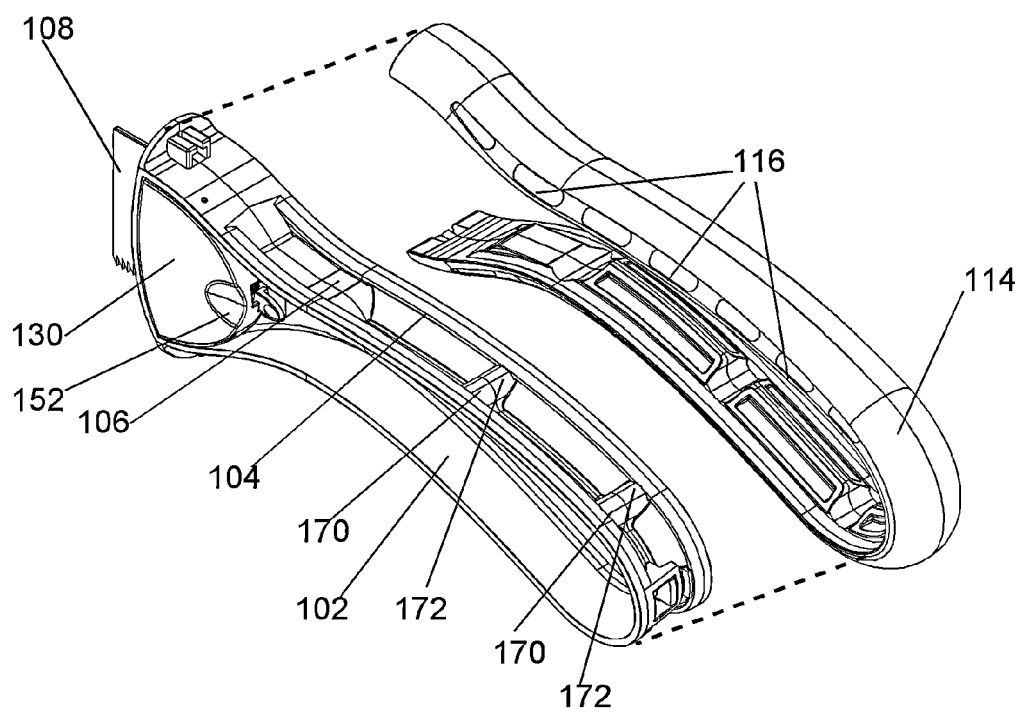
FIG. 10 is an exploded perspective view of the grip and handle portions of the saw of FIG. 1.

Assembly of the handle portions can be understood with reference to FIGS. 6-8. As shown in FIG. 8, inactive paddle 150 is secured to handle portion 104 with a suitable fastening mechanism, such as a screw 156 extending through hole 158 near the end of handle portion 104 and into threaded engagement with internally threaded boss 160 on inactive paddle 150. As shown in FIG. 9, handle portion 102 is mated with handle portion 104, with projections 162 on the internal surface of handle portion 104 engaging bosses 164 in the internal surface of handle portion 102. The handle portions are joined to each other with suitable fasteners, such as screws 166 and 168, with ridges 170 and 172 aligned with each other. Then grip 114, including cells 116, is positioned over the mated handle portions (FIG. 10) by adhering the grip 114 over the curved ends of the handle portions, such as with a male/female connection, glue, a sliding track, or combinations thereof. It may be desirable to glue or otherwise bond grip 114 to the handle portions 102 and 104.

To insert a saw blade 108 into the slotted 124 between the mated handle portions 102 and 104, connection paddle 130 is depressed to move connection pin 128 away from handle portion 104. The blade is positioned with non-cutting end 122 butting against shoulders 110 and 112 of handle portions 102 and 104. Then connection paddle 130 is released, and the end of connection pin 130 passes through opening 126 in blade 108. The process is reversed to release the blade 108. Thus, a blade can be safely and easily inserted and removed from the handles without using tools.

Figure 11:
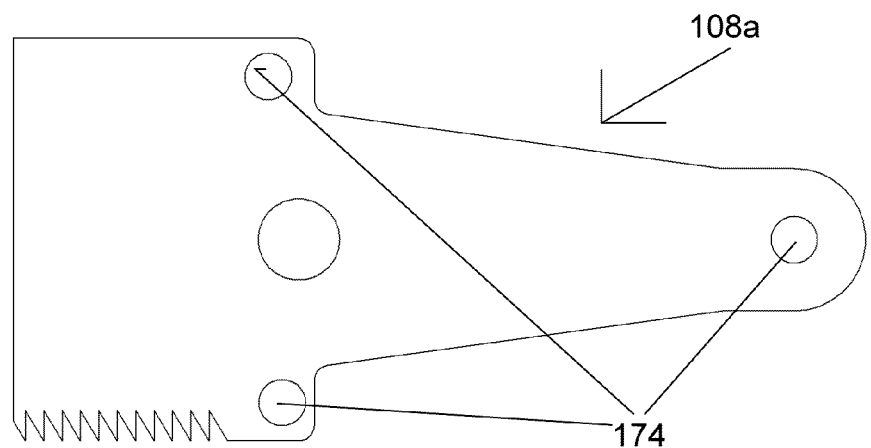
FIG. 11 is a side view of another blade for use with the saw of FIG. 1.
Figure 12:
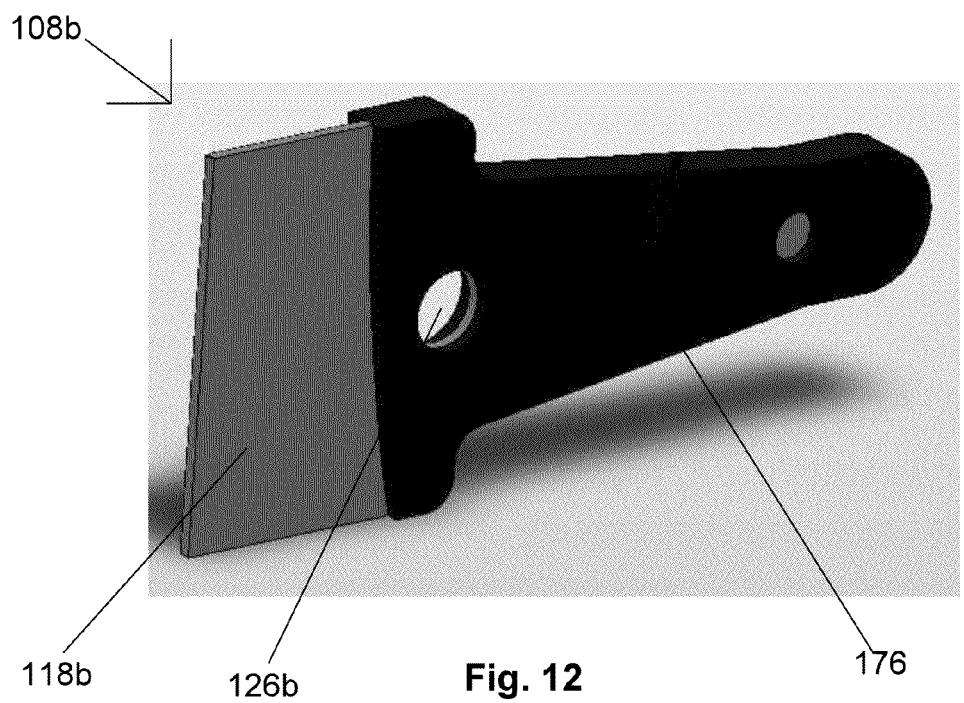
FIG. 12 is a perspective view of yet another blade for use with the saw of FIG. 1.

Further, a variety of blades can be used interchangeably, depending on the needs of the user. As shown, in FIG. 11, blade 108a is thinner than blade 108, with dimples 174 extending outward from one face of the blade to ensure a tight fit between the ends of the handle portions 102 and 104. The cutting end 118 of the blade may have any desired shape. As shown in FIG. 12, it may be desirable to provide a boot 176 molded onto non-cutting end 122b of blade 108b to decrease the tolerances needed in forming the handle and to ensure that the blade is held tightly in the handle over a wide range of temperatures. The boot may be formed from polyvinyl chloride (PVC) or another moldable elastomeric material.

Lopper

Figure 13:
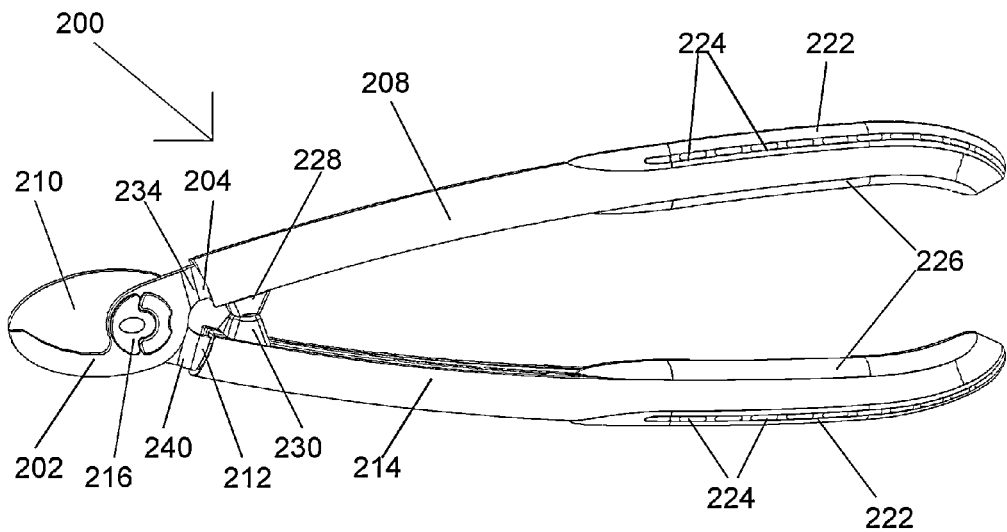
FIG. 13 is a front perspective view of a lopper in accordance with the present invention.
Figure 14:
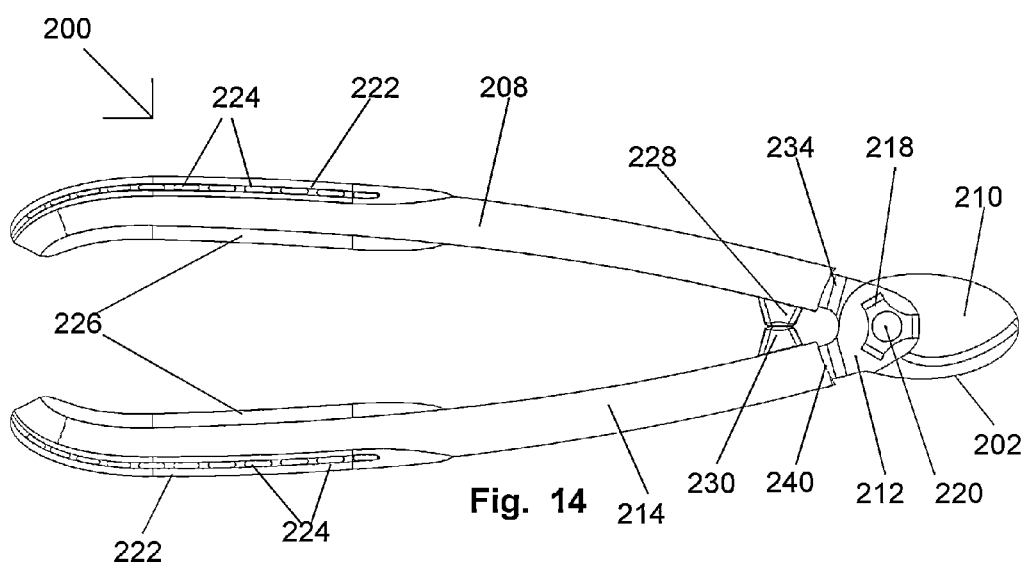
FIG. 14 is a rear elevation view of the lopper of FIG. 13.

Another embodiment of the invention comprises a lopper, as shown in FIGS. 13-18. Referring to FIGS. 13 and 14, lopper 200 includes a first blade 202 with an integral tang 204 that is inserted into a slot 206 in an first handle 208, a second blade 210, a second blade support 212, and a second handle 214. First blade 202, second blade 210, and second blade support 212 are joined together at a fulcrum area between a D-ring fastener 216, a multipronged washer 218, and a nut 220. Resilient grips 222 and 226 are mounted onto handles 208 and 214, and the grips 222 on the outside surfaces of the handles 208 and 214 include cells 224. Resilient grips 226 are positioned on the handle surfaces that face each other. Bumpers 228 and 230, attached to first handle 208 and second handle 214, respectively, provide shock absorption when the lopper 200 is used for cutting. The grips 222 and 226, in combination with the bumpers 228 and 230, allow longevity of use and reduce fatigue and the risk of injury to the muscles, tendons, and joints in the user's hands and arms.

Figure 15:
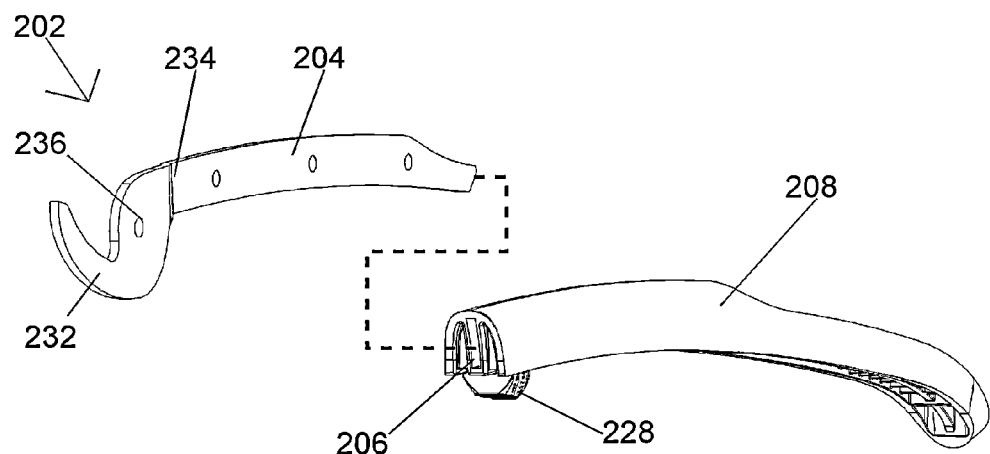
FIG. 15 is an exploded perspective view of the second blade and handle of the lopper of FIG. 13.

As shown in FIG. 15, first blade 202 has a curved cutting end 232 offset from tang 204 at offset bend 234. First blade 202 also includes a circular hole 236 between curved cutting end 232 and offset bend 234 that accommodates the shank of D-ring fastener 216.

Figure 16:
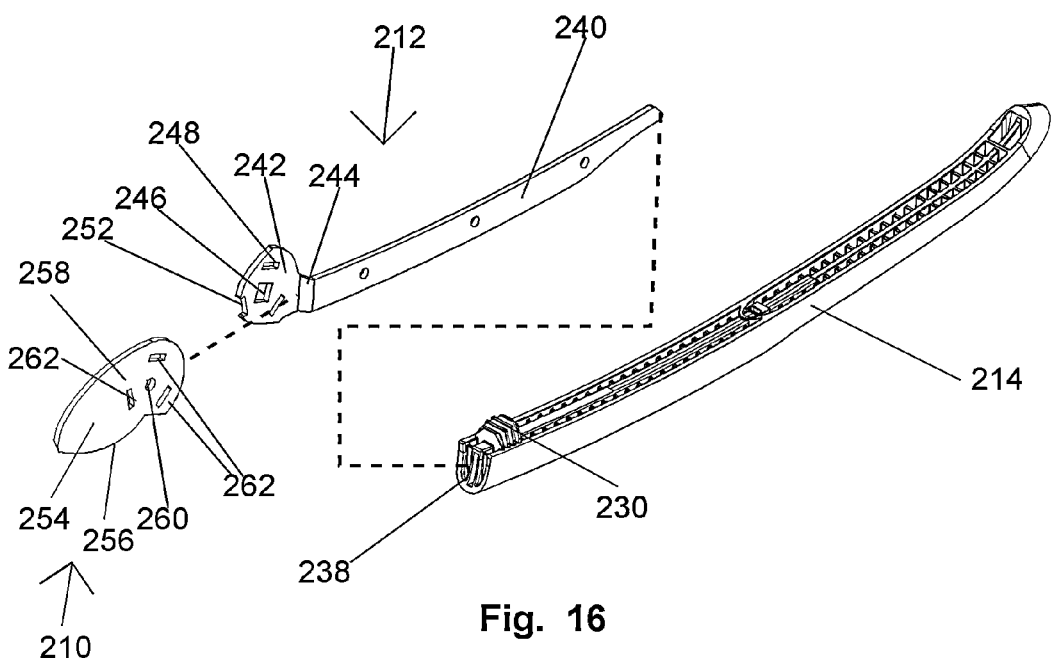
FIG. 16 is an exploded perspective view of the first blade, first blade support, and handle of the lopper of FIG. 13.

As shown in FIG. 16, second handle 214 has a slot 238 at the end adjacent the blades into which a tang 240 at the end of second blade support 212 is inserted. Second blade support 212 includes a blade engaging portion 242 that is offset at bend 244 from the tang 240. Blade engaging portion 242 includes a square opening 246 sized to accommodate the square shank of nut 220, and elongated openings 248 sized to accommodate the prongs 250 of washer 218. A peripheral notch 252 accommodates the third prong 250 of washer 218.

Second blade 210 has a cutting portion 254 with a cutting edge 256 and a blade mounting portion 258, seen best in FIG. 16. A circular hole 260 and elongated slots 262 extend through the blade mounting portion 258. Hole 260 is sized to accommodate the shank of nut 220, and slots 262 are sized to accommodate the prongs 250 of washer 218. D-ring fastener 216, nut 220, and washer 218 retain second blade 210 between first blade cutting end 232 and blade engaging portion 242 of second blade support 212.

Figure 21:
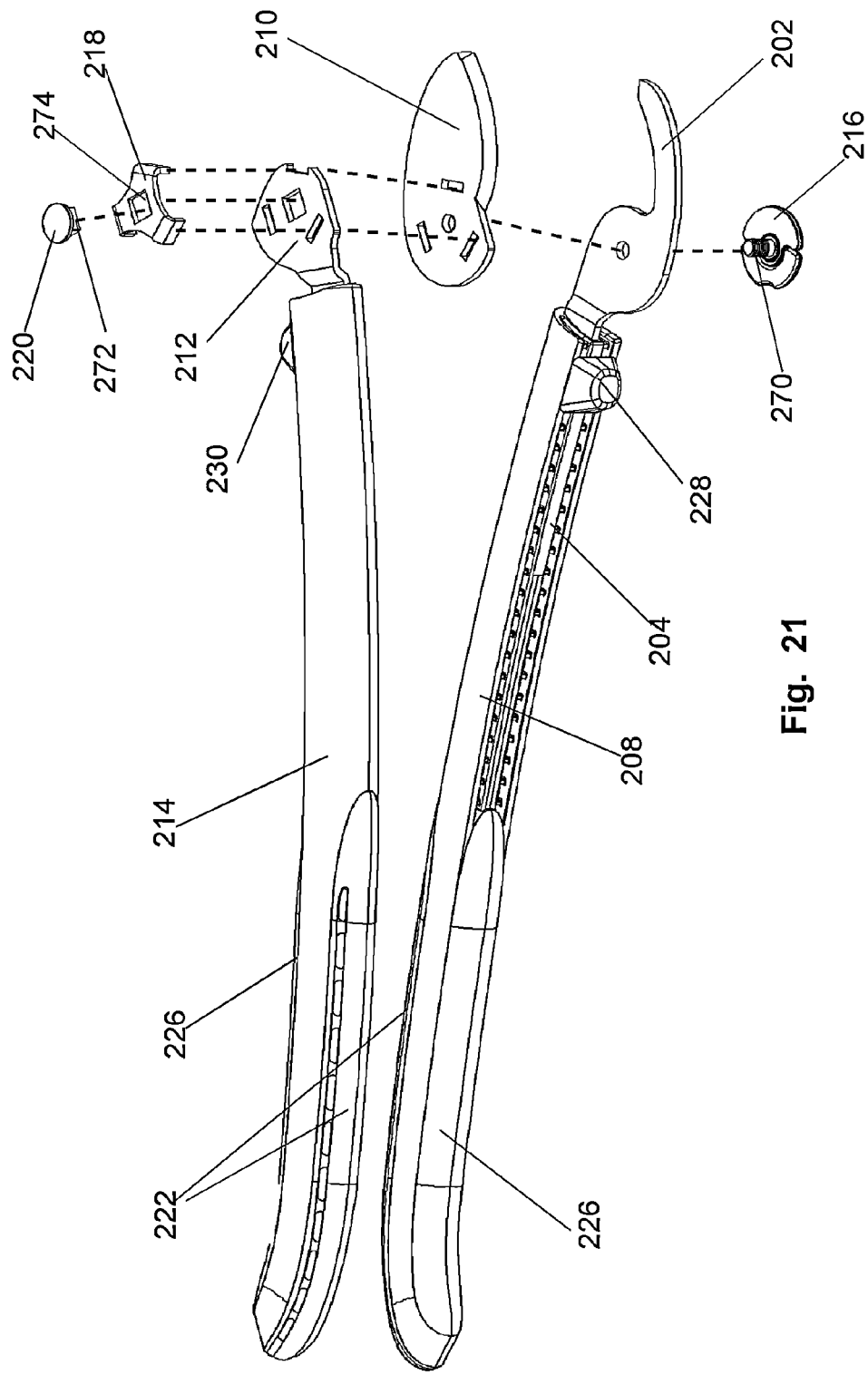
FIG. 21 is an exploded perspective view of the loppers of FIG. 13.
Figure 22:
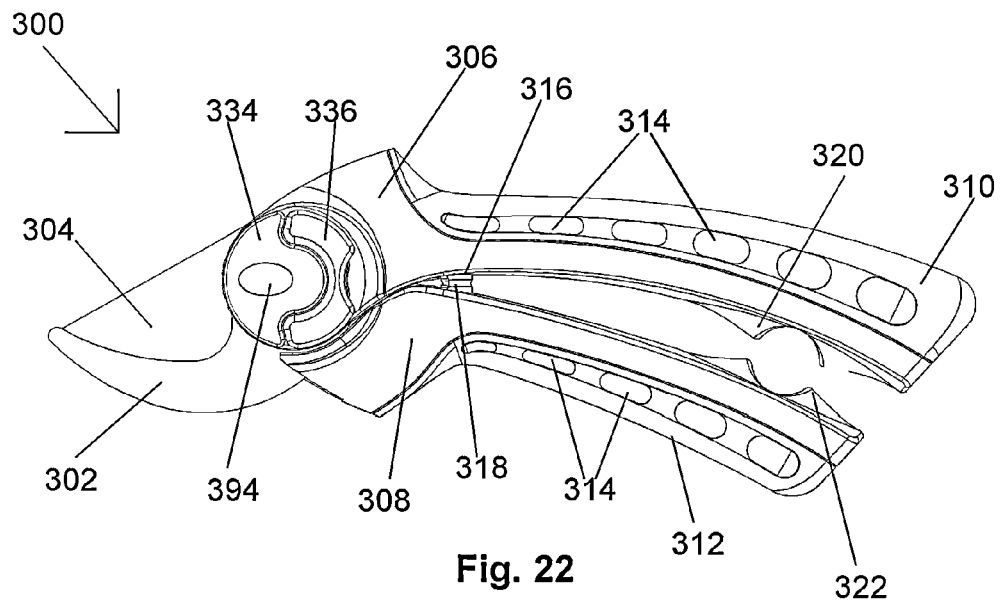
FIG. 22 is a left side view a pruner in accordance with the present invention.
Figure 23:
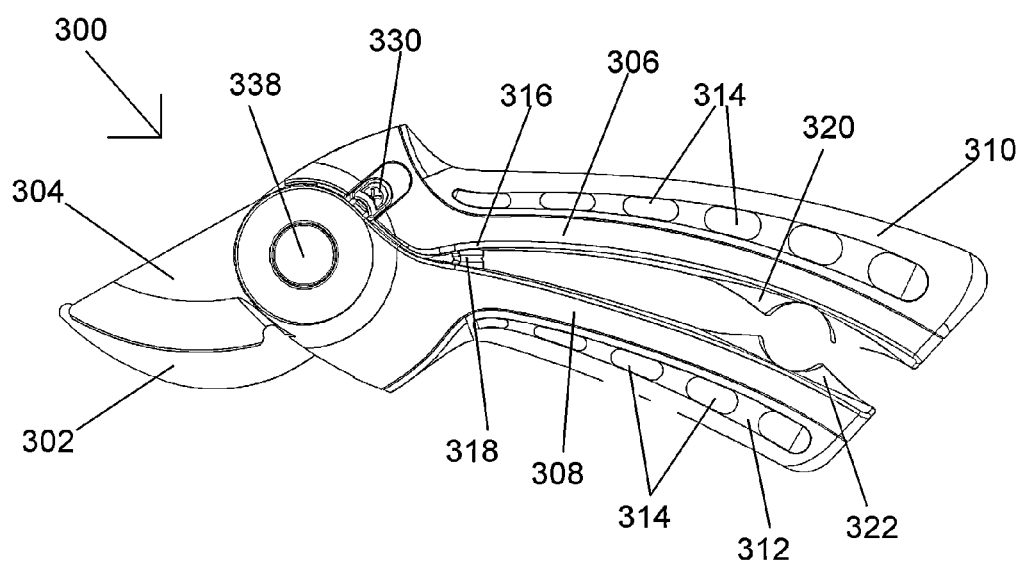
FIG. 23 is a right side view of the pruner of FIG. 22.
Figure 24:
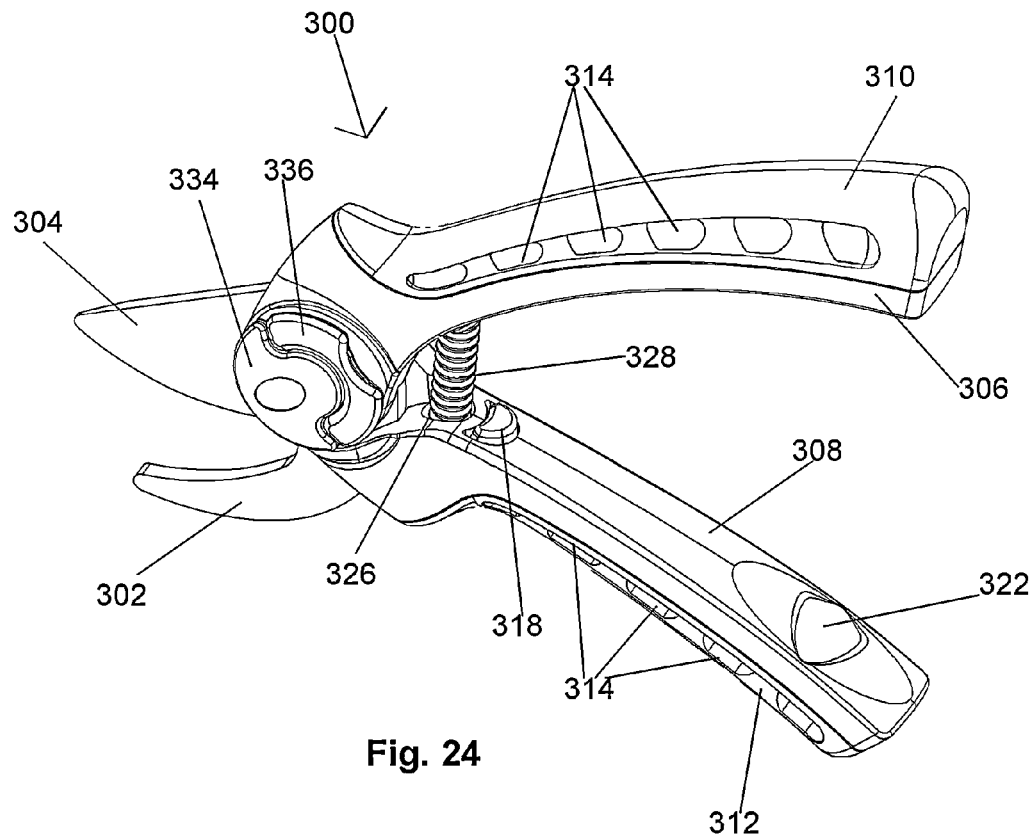
FIG. 24 is a perspective view of the open pruner of FIG. 22.

Referring to FIGS. 17 and 18, D-ring fastener 216 comprises a head 264, a bail or handle 266 rotatably attached to head 264 with hinge pins 266, and a shank 268 with a threaded end 270. The bail or handle 266 is normally rotated into a position where it is coplanar with head 264 during use of the lopper. For blade removal or replacement, bail 266 can be rotated outward from the plane of the head 264 to provide a handle that can be gripped securely between a user's fingers and thumb to unscrew D-ring fastener shank 268 from nut 220 or screw D-ring fastener shank 268 into nut 220. As shown in FIG. 21, nut 220 has an internally threaded shank 272 with a square profile. Washer 218 has multiple peripheral prongs 250 and a square opening 274 sized to accommodate nut shank 270.

Referring to FIG. 19, D-ring fastener head 264 protrudes outward from the first blade 202 less, shown as distance A, than the washer and nut protrude from the second blade, shown as distance B. Thus, the cutting plane of the blades is offset relative to the width of the fulcrum assembly, allowing cuts to be made close to any protruding branches on a plant.

Figure 20:
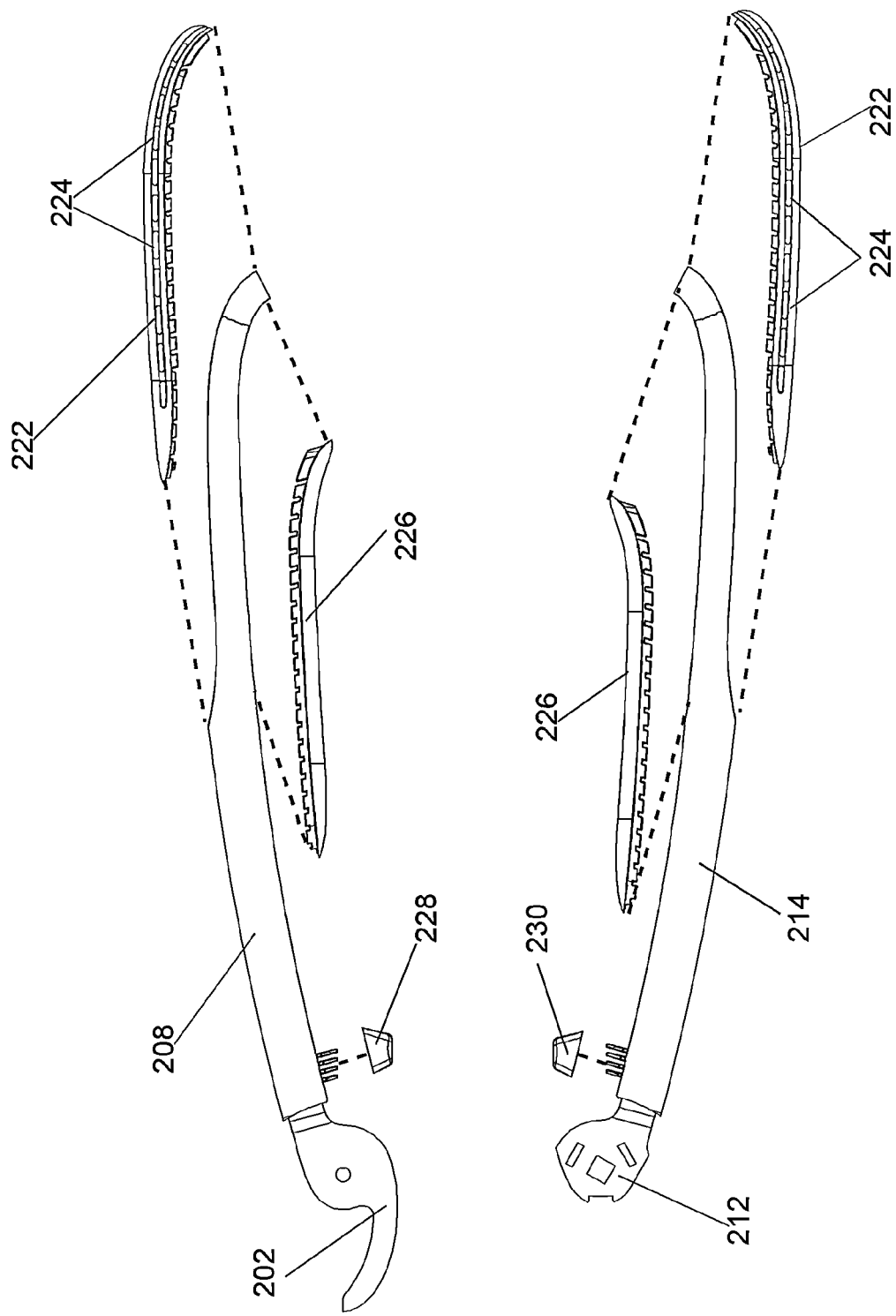
FIG. 20 is an exploded side elevation showing the handles of the lopper of FIG. 13.

To assemble lopper 200, the tang 204 of the first blade 202 and tang 240 of the second blade support 212 are fixed into the respective handles 208 and 214, if the handles were not insert molded onto the tangs, as shown in FIGS. 15 and 16. Referring to FIG. 20, the grips 222 and 224 are mounted onto the respective handles 208 and 214 if they were not insert molded onto the handles. The bumpers 228 and 230 are mounted onto the handles. Optionally, adhesive or another type of bond or insertion process may be used to hold the grips and/or bumpers in place. As shown in FIG. 21, the nut shank 270 is inserted through the square hole 274 in washer 218, and the nut shank 270 and washer prongs 250 are inserted through the openings 248 and 262 in the second blade support 212 and openings 236 and 238 in the second blade 210. The second blade 210 is placed over the end of the nut 220, and the D-ring fastener shank 268 is screwed into nut 220 to hold the blades and handles together. Bail 266 on D-ring fastener 216 can be rotated outward for use as a handle to tighten the D-ring fastener 216 into the nut 220. The bail is rotated back to its normal position against the D-ring fastener head 264 during use of the lopper.

To replace the second blade 210, the bail 266 can be used as a handle to unscrew D-ring fastener 216, allowing second blade support 212 and second blade 210 to be removed. The new blade and handles are then re-assembled as described above. No tools are necessary to remove and replace the second blade.

The square openings 274 and 246 in the washer 218 and the first blade 202, respectively, allow the nut 220, first blade 202, and washer 218 to rotate as a unit about the D-ring fastener fulcrum axis. Alternatively, the square portion of the nut shank and the square holes could have another polygonal shape. The slots 238 and notch 252 in the second blade support 212 and the slots 248 in the second blade 210 cooperate with washer prongs 250 to prevent relative rotational motion of the nut 220 relative to D-ring fastener 216 during use. Second bade support 212 and second blade 210 rotate about D-ring fastener shank 268 during use.

Pruner 1

Another embodiment of the present invention comprises pruner 300, shown in FIGS. 22-25. First blade 302 and second blade 304 are sandwiched between upper second handle 306 and first handle 308 (as viewed in FIGS. 27 and 28). First and second handles 306 and 308 each have a gripping portion with resilient grips 310 and 312, respectively, which include cells 314. The sides of the handles that face each other have bumpers 316 and 318 that provide shock absorption when the pruner blades are moved into a closed position. Extensions 320 and 322 extend toward each other and define a rounded space with a diameter representing the largest branch diameter that the pruner 300 is capable of cutting. When the pruner 300 can no longer cut that diameter branch properly, the blades 302 and 304 are worn and need to be replaced or sharpened. Recesses 324 and 326 in the handles near the fulcrum area retain the ends of a spring 328 positioned within an optional protective spring boot (not shown). The spring biases the handles in an open position. Lock mechanism 330 on second handle 308 is slidable between an open position that allows the pruner to be used for cutting and a locked position where the end of the lock mechanism 330 is inside a slot 332 in first handle 306 (best seen in FIG. 28). The top surface of first handle 306 and the lower surface of second handle 308 include recesses and projections which mate with recesses and projections on grips 310 and 312.

A D-ring fastener 334 with a D-ring bail or handle 336 and a nut 338 hold the handles and blades together so that the second handle 306 and second blade 304 rotate as a unit relative to first handle 308 and first blade 304. D-ring fastener 334 has a cylindrical shank 340 with a threaded end 342. Nut 338 has a head 344 and an internally threaded square-cross-section shank 346. D-ring fastener 334 allows removal and replacement of blades without using any tools.

Figure 25:
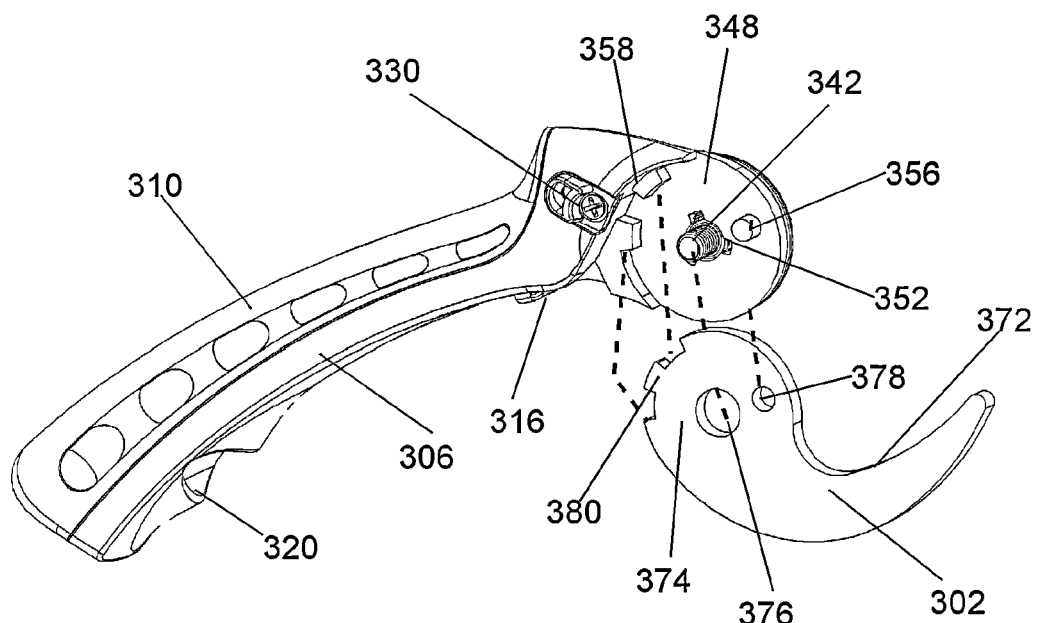
FIG. 25 is an exploded perspective view of the second handle and second blade of the pruner of FIG. 22.

As shown in FIG. 25, first handle 308 has a fulcrum portion 348 through which the handles and blades are secured to each other. The outside surface of the fulcrum portion, facing away from the blades, has a recess 350 into which the nut head 344 fits, with the outer surface of the nut substantially flush with the outer surface of the fulcrum portion 348. An opening 352 through the fulcrum portion 348 accommodates the D-ring fastener shank 340 and the prongs of pronged locking washer 354 (seen in FIG. 27) with the prongs extending inward from the outer surface of the fulcrum portion 360. The internal surface of the fulcrum portion 348, facing toward the blades, has a pin 356 projecting inwards and a shoulder 358 with a series of interlocking tabs and notches.

Figure 26:
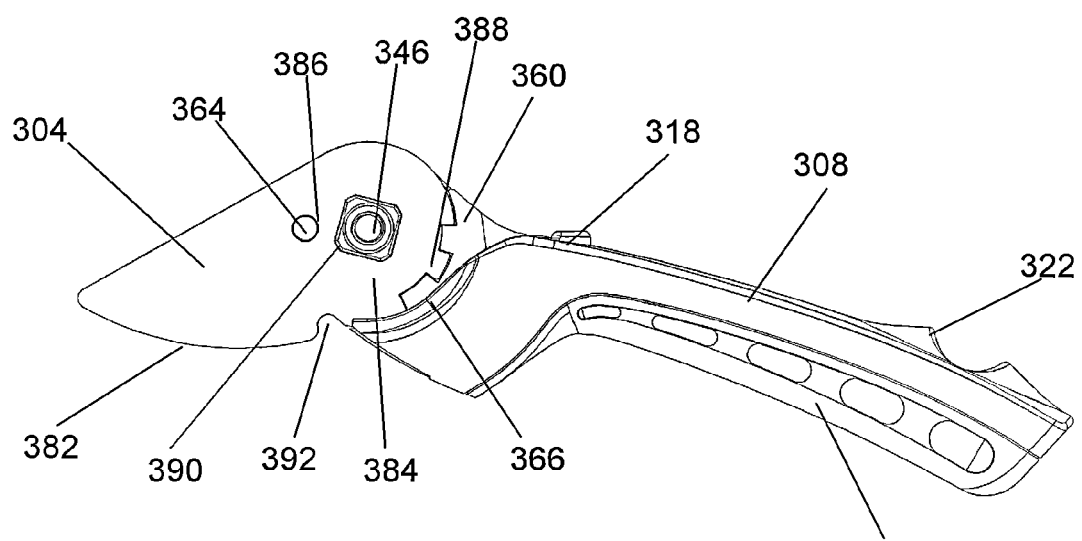
FIG. 26 is a side view of the first handle and first blade of the pruner of FIG. 22.

Referring to FIG. 26, second handle 304 also has a fulcrum portion 360 with a square hole 362 through which the D-ring fastener shank 340 extends. Square hole 362 is formed to accommodate the square portion of nut shank 346. Alternatively, the nut shank and hole could have a different polygonal shape. The inner surface of the fulcrum portion 360 has a pin 366 projecting inwards and a shoulder 368 with a series of interlocking tabs and notches.

First blade 302 has a cutting edge 372 and a fulcrum portion 374 with a round through hole 376 sized and positioned to accommodate D-ring fastener shank 340, a hole 378 sized and positioned to accommodate pin 354 and an edge 380 having a series of interlocking tabs and notches complementary to the interlocking tabs and notches of the first handle shoulder 356. The interlocking tabs and notches, along with pin 354 and hole 376, prevent relative rotation between the second handle and the first blade about the D-ring fastener shank, which defines a fulcrum axis.

Second blade 304 also has a cutting edge 382 and a fulcrum portion 384 with a hole 386 and a series of interlocking notches and tabs along its edge 388. Hole 386 and edge 388 are formed to mate with pin 354 and the interlocking notches and tabs of first handle shoulder 356. A square through hole 390 accommodates the square portion of nut shank 346. A notch 392 in cutting edge 382 can be used for cutting wires and ties.

Figure 27:
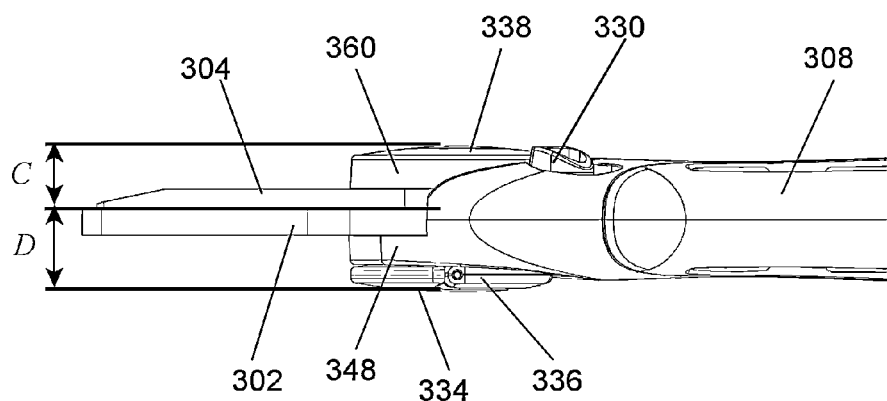
FIG. 27 is a top view of the blades and a portion of the handles of the pruner of FIG. 22.

As shown in FIG. 27, the plane along which blades 302 and 304 cut is offset from the longitudinal axis of the handles. Thus, the nut side of the pruner can be positioned close to protruding branches or twigs to provide a close trim of a plant, with distance C between the cutting plane and the outer surfaces of the nut and the second handle fulcrum portion less than distance D between the cutting plane and the outside surfaces of the D-ring fastener and first handle fulcrum portion. Also, lock mechanism 330 does not protrude outward farther than the exterior surface of second handle fulcrum portion 358.

Figure 28:
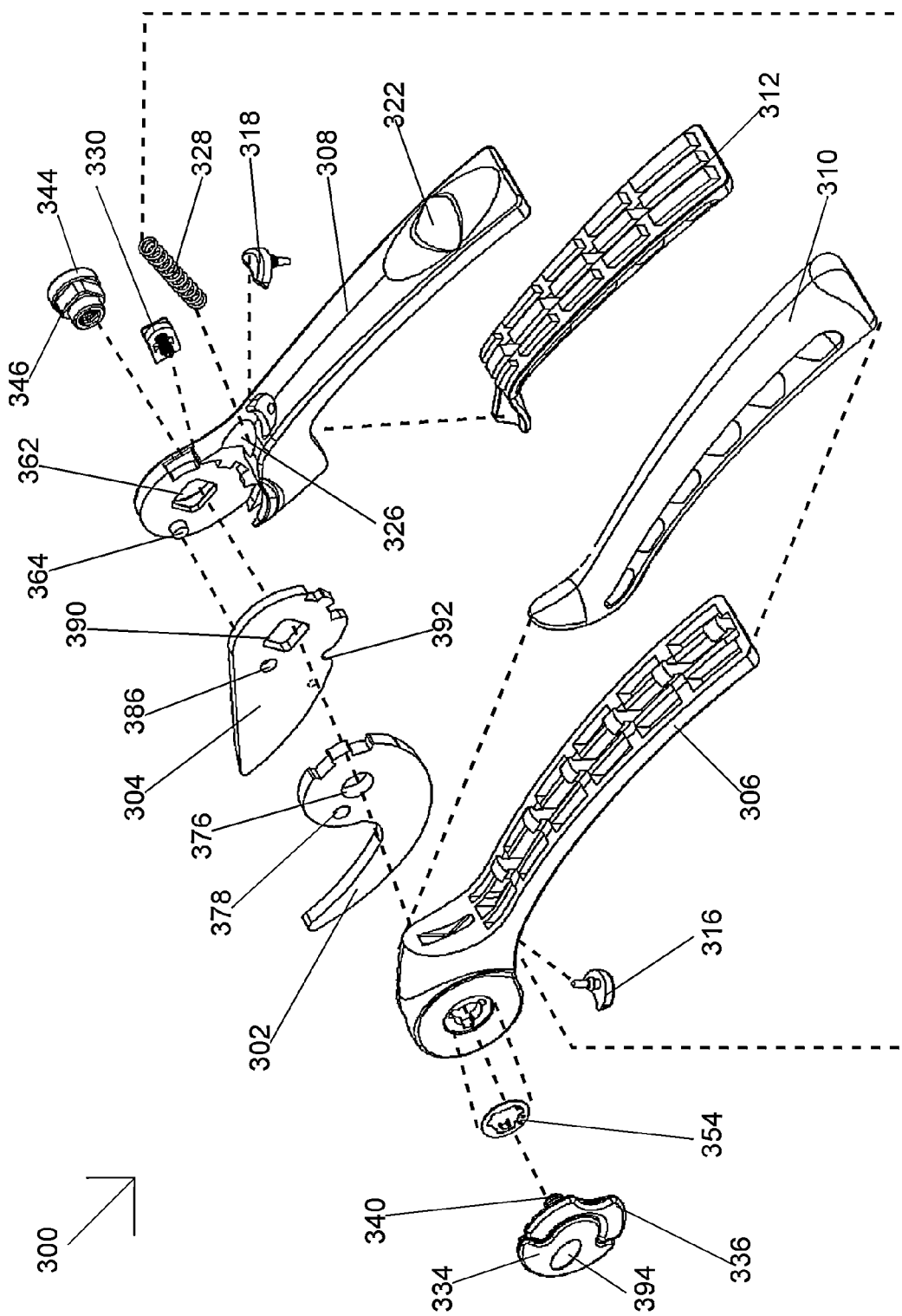
FIG. 28 is an exploded perspective view of the pruner of FIG. 22.
Figure 29:
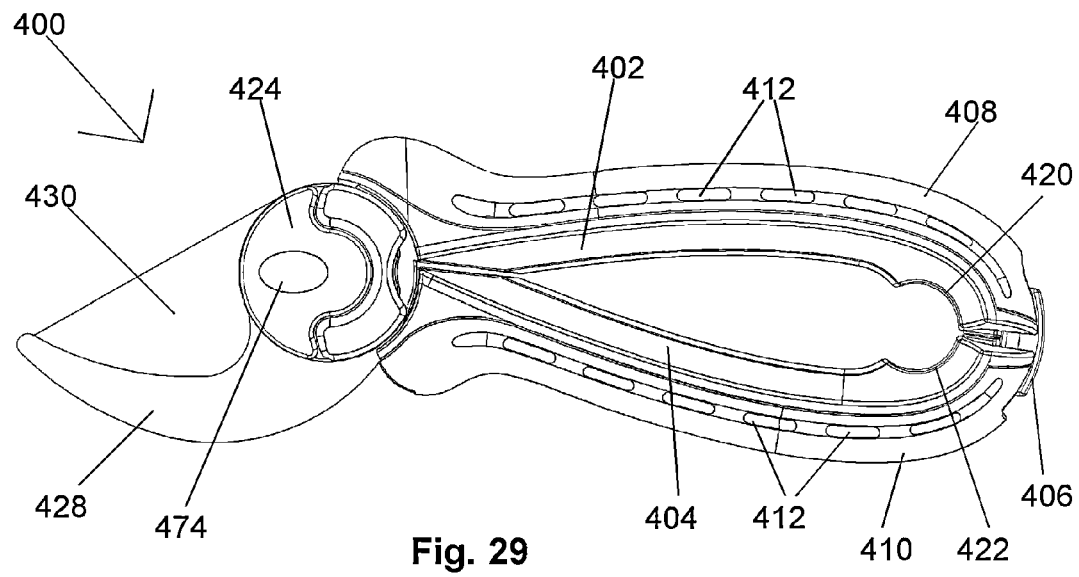
FIG. 29 is a left side view of another embodiment of the invention, another pruner.
Figure 30:
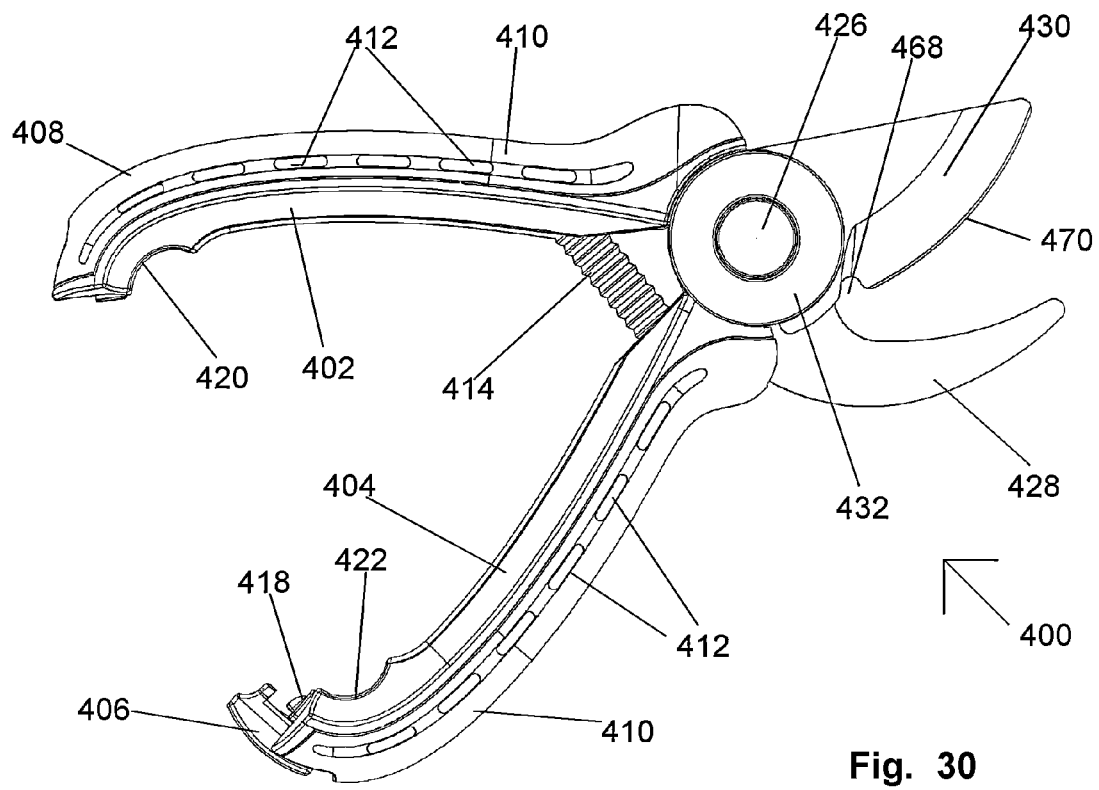
FIG. 30 is a right side view of the open pruner of FIG. 29.
Figure 31:
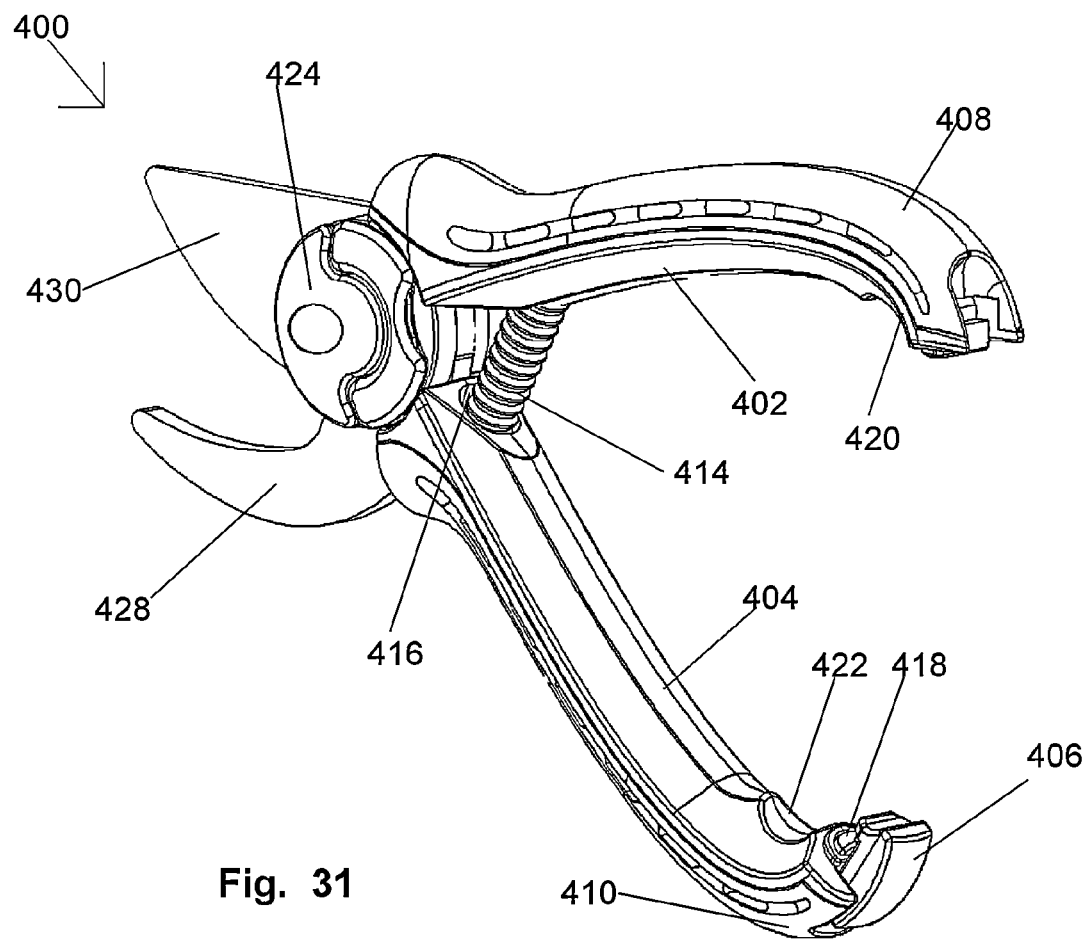
FIG. 31 is a perspective view of the open pruner of FIG. 29.

Assembly of the pruner 300 can be understood with reference to FIG. 28. Grips 310 and 312, with integral cells 314, are positioned on second and first handles 306 and 308, respectively, with the projections and recesses mated. Bumpers 316 and 328 are inserted into recesses on the respective handles or otherwise attached to the handles. Lock mechanism 330 is attached to second handle. Nut shank 346 is inserted through square hole 386 in second handle 306. Second blade 304 is placed around nut shank 346, with recess 386 engaging pin 362 and edge 388 engaging shoulder 364. First blade 302 is placed around the end of nut shank 346, and first handle 308 is placed over first blade 302 with pin 354 in hole 378 and shoulder 356 engaging with blade edge 380. Then pronged washer 366 is placed against the outer surface of the fulcrum portion 374 of first handle 308, with the prongs extending into opening 352. The D-ring fastener shank 340 is inserted though the washer 366, the hole 352 in first handle 308, and D-ring fastener 334 is screwed into nut 338. The spring 328 is placed inside the optional spring boot, and the spring/boot combination is compressed, and the spring and boot ends are placed into the recesses 324 and 326 between the second and first handles. The handles include a stop-gap feature that prevents the handles from opening far enough for the spring to pop out during use.

Removal and replacement of blades is simple and requires no tools. With the handles locked together, the D-ring bail 336 on D-ring fastener 334 is rotated so that it can be gripped between the user's thumb and finger, and the D-ring fastener 334 is unscrewed from the nut 338. The first handle 308 and blades 302 and 304 are removed. The pruner can be re-assembled with the same blades or one or more replacement blades, following the process described above.

Pruner 2

Figure 33:
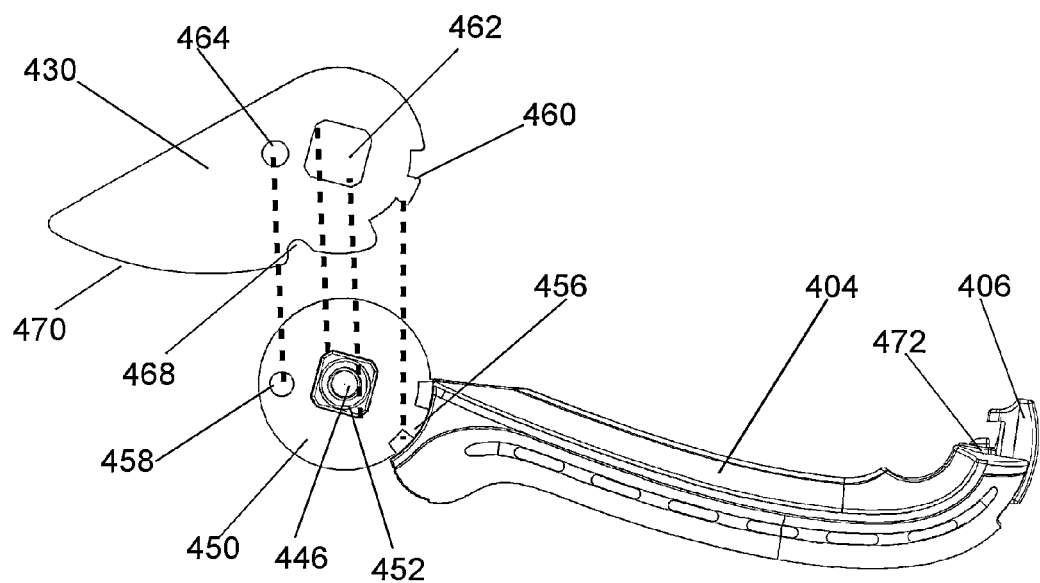
FIG. 33 is an exploded perspective view of the other handle, other blade, and nut of the pruner of FIG. 29.

Still another embodiment of the present invention comprises pruner 400, shown in FIGS. 29-32. Handles 402 and 404 have a lock mechanism 406 positioned at the end of handle 404 distal from the fulcrum area and blades and recessed into the handle to provide a low profile. Lock mechanism 406 includes a spring that biases the mechanism in an open position. When locked, the blades form a closed loop structure. Resilient grips 408 and 410 are on the outside of the loop structure and include cells 412. A spring 413 (shown in FIG. 35), surrounded by an optional spring boot 414 near the fulcrum area of the pruner urges the handles and blades apart. Handles 402 and 404 each have a recess, shown in FIGS. 33 and 35 as recess 416 in handle 404, in which the ends of the spring and spring boot 414 are retained. A bumper 418 at the end of handle 404 provides shock absorption when the pruner is closed during use. Adjacent the ends of the handle, arcs 420 and 422 define a partial circle with a diameter indicating the largest branch size which the pruners are capable of cutting. The partial circle also provides an indication of blade wear; if the pruners 400 no longer cut branches of that diameter properly, the blades are worn and need to be replaced or sharpened.

A D-ring fastener 424 and nut 426 hold two blades 428 and 430 between the ends of the handles 402 and 404. The head of D-ring fastener 424 includes a D-ring or bail handle, described above with reference to lopper 200 and pruner 300, and described in more detail below. Nut 426 is formed as described above for nut 338 in pruner 300.

The end 432 of handle 402 at the fulcrum area of the pruner has substantially planar surfaces adjacent the head of D-ring fastener 424 and blade 428, with a through hole 434 sized and shaped to accommodate a pronged lock washer 436 (shown in FIG. 35) between D-ring fastener 424 and handle 402. Shoulder 438, where handle end 432 is joined to the rest of the handle, includes a series of interlocking tabs and notches. Pin 440 extends inward from handle end 432.

Blade 428 has an edge 442 with a series of notches and interlocking tabs, a round through hole 444 sized and positioned to accommodate the round end of nut shank 446, and a hole 448 sized and positioned to receive pin 440 on handle end 432. The interlocking notches and tabs on blade 428 complement the interlocking tabs and notches of handle shoulder 438. The interlocked notches and tabs and the engagement of pin 440 in hole 448 lock blade 428 to handle 402 prevent relative rotational motion about the fulcrum axis.

Similarly, handle 404 has an end 450 at the fulcrum area of the pruner with substantially planar surfaces adjacent the nut 426 and blade 430, with a square through hole 452 sized and shaped to accommodate the square portion of nut shank 446 with nut head 454 countersunk into the exterior surface of handle end 450 to present a smooth, substantially flat outer surface. Shoulder 456, where handle end 450 is joined to the rest of the handle 404, includes a series of interlocking tabs and notches. Pin 458 extends inward.

Blade 430 has an edge 460 with a series of interlocking notches and tabs, a square through hole 462 sized and positioned to accommodate the square end of nut shank 446, and a hole 464 sized and positioned to receive pin 458 on handle end 450. The interlocking notches and tabs on blade 430 complement the interlocking tabs and notches of handle shoulder 450. As with blade 428 and handle 402, the interlocked notches and tabs and the engagement of pin 452 in hole 458 lock blade 430 to handle 404 and prevent relative rotational motion about the fulcrum axis. Blade 430 has a notch 468 in its cutting edge pruner 470, for use in cutting wires and ties.

Figure 34:
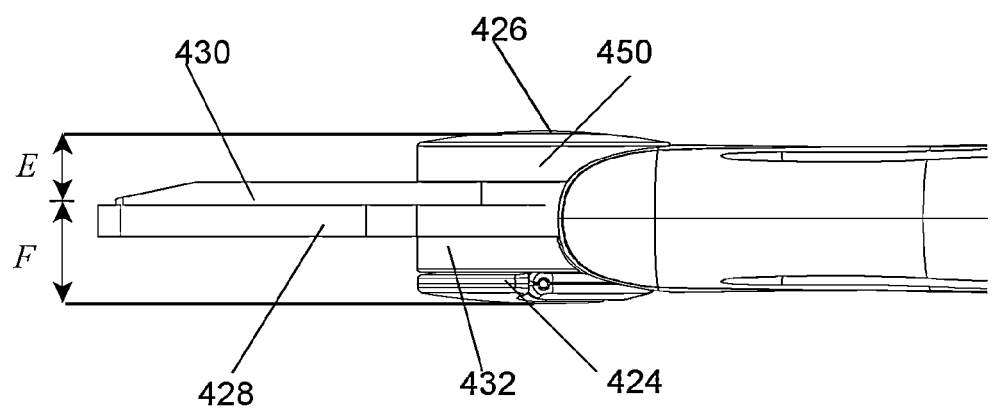
FIG. 34 is a top view of the blades and a portion of the handles of the pruner of FIG. 29.
Figure 32:
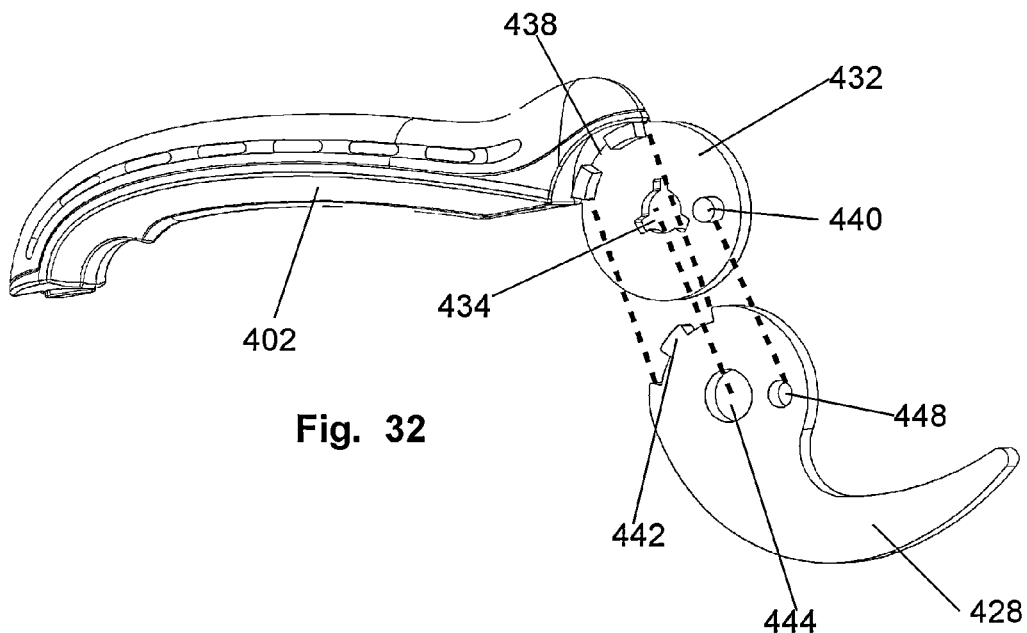
FIG. 32 is an exploded perspective view of one handle and blade of the pruner of FIG. 29.

As shown in FIG. 34, the cutting plane between blades 428 and 430 is offset from the plane oriented longitudinally through the centers of the handles 402 and 404, with the outer surface of nut head 454 and handle end 404 presenting a smooth profile. The distance E between the cutting plane and the outer surface of nut head 454 is smaller than the distance F between the cutting plane and the outermost portion of D-ring fastener 424. Thus, pruner 400 can be used to cut plants as close to extending stems or trunks as a traditional pruner without interchangeable blades. The relatively flat, smooth profile of the outer surfaces of handle end 450 and nut head 454 help avoid damage to the uncut portion of the plants when such close cuts are made.

Figure 35:
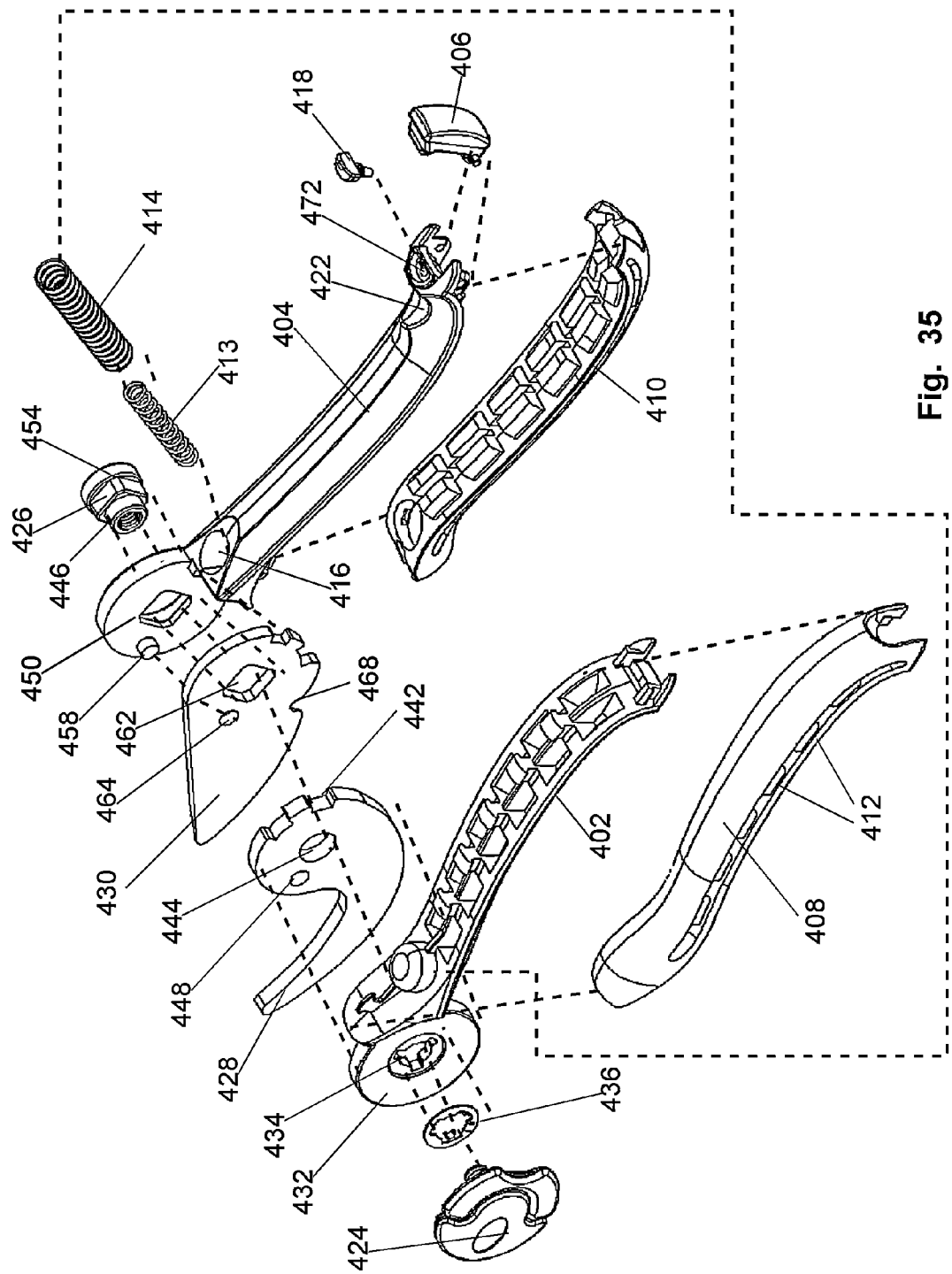
FIG. 35 is an exploded perspective view of the pruner of FIG. 29.

Assembly of pruner 400 can be understood with reference to FIG. 35. Grips 408 and 410, with integral cells 412, are positioned on handles 402 and 404, respectively. Bumper 418 is inserted into a complementary well 472 at the end of handle 404, and lock mechanism 406 is secured to handle 404. Nut shank 446 is inserted through square hole 444 in handle 404, and blade 430 is placed onto nut shank 446 with the respective tabs and notches of blade 430 and handle 404 interlocked and pin 458 inside hole 464 in blade 430. Blade 428 is placed onto blade 430, with nut shank 446 extending through round hole 444. Handle 402 is placed onto blade 428, with the respective notches and tabs of blade 428 and handle 402 interlocked and pin 440 engaged in hole 448. Lock washer 436 is placed onto the outer surface of handle 402, with its prongs extending into the hole 444 in the handle. D-ring fastener 424 is then inserted into the assembly and threadably mated with nut 426. The D-ring handle or bail on D-ring fastener 424 is positioned for gripping by the user and used to tighten D-ring fastener 424 into nut 426.

To remove blades, the D-ring fastener 424 is unscrewed from the nut 426, and the handles and blades are separated. To replace the blades, the blades are repositioned against and between the handles and secured with nut 426 and D-ring fastener 424, as described above.

Grass and Hedge Shears

Figure 36:
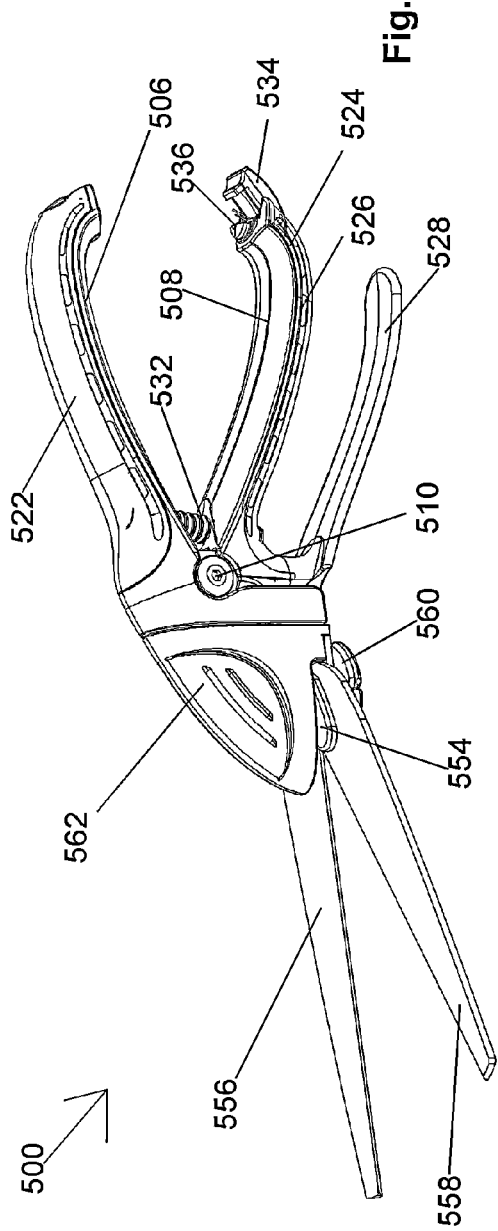
FIG. 36 is a perspective view of a pair of yet another embodiment of the present invention, a pair of grass or hedge shears.
Figure 37:
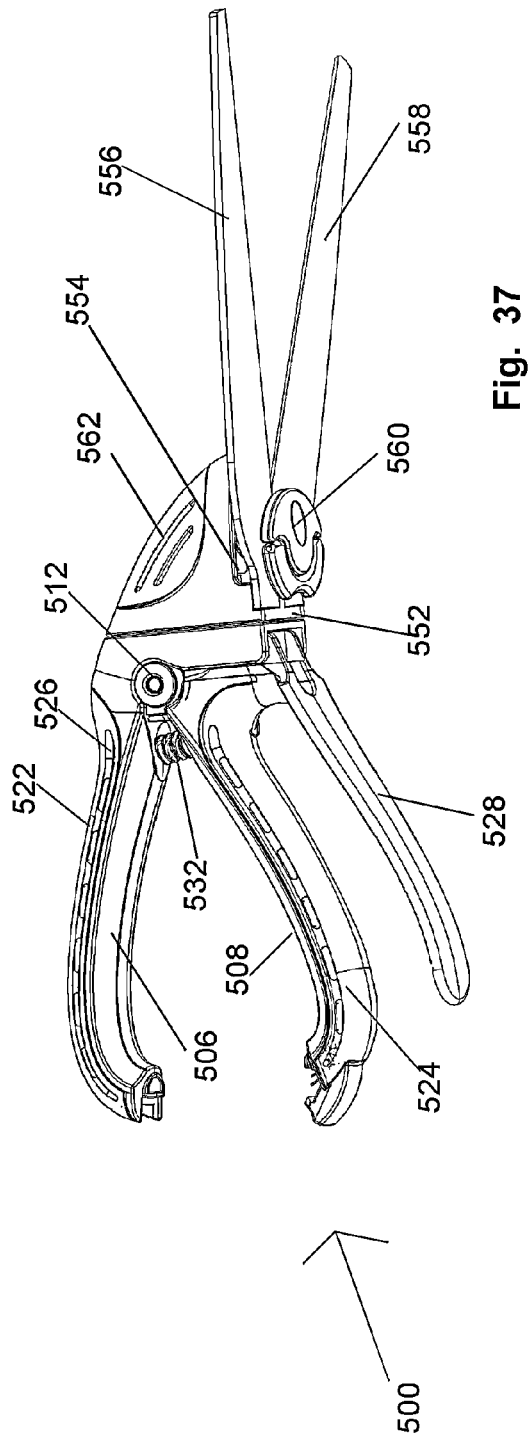
FIG. 37 is another perspective view of the grass or hedge shears of FIG. 36.
Figure 38:
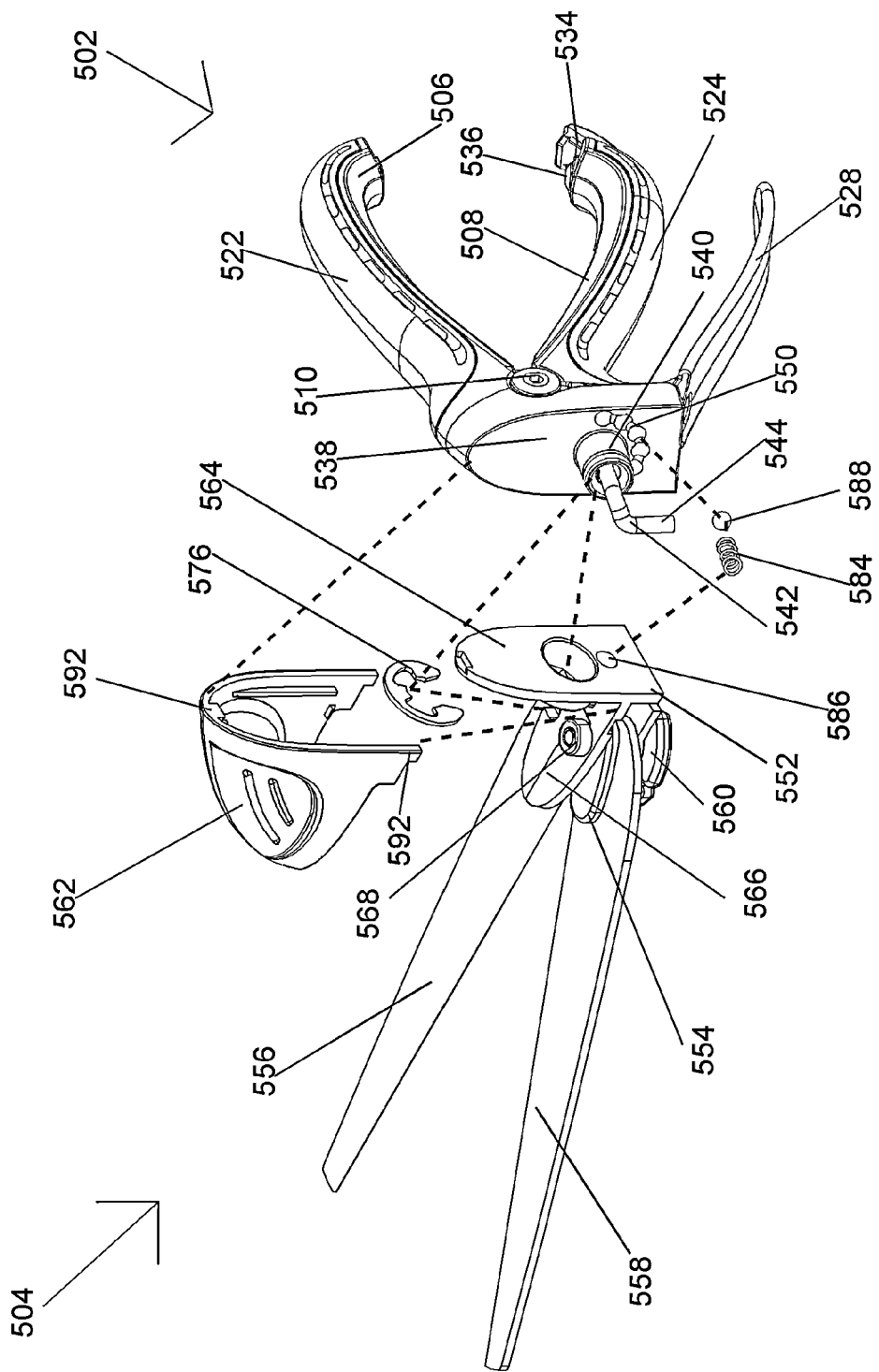
FIG. 38 is an exploded perspective view showing the handle and blade assemblies of the shears of FIG. 36.

Another embodiment of the present invention is grass or hedge shears 500, shown in FIGS. 36-42. The shears comprise a handle assembly 502 and a blade assembly 504, secured to each other, as shown in FIGS. 36, 37, and 38. The blade assembly 504 is rotatable relative to the handle assembly 502 so that the cutting plane between the blades can be oriented for maximum efficiency and comfort of the user. The blades are interchangeable and replaceable without the use of tools.

Figure 39:
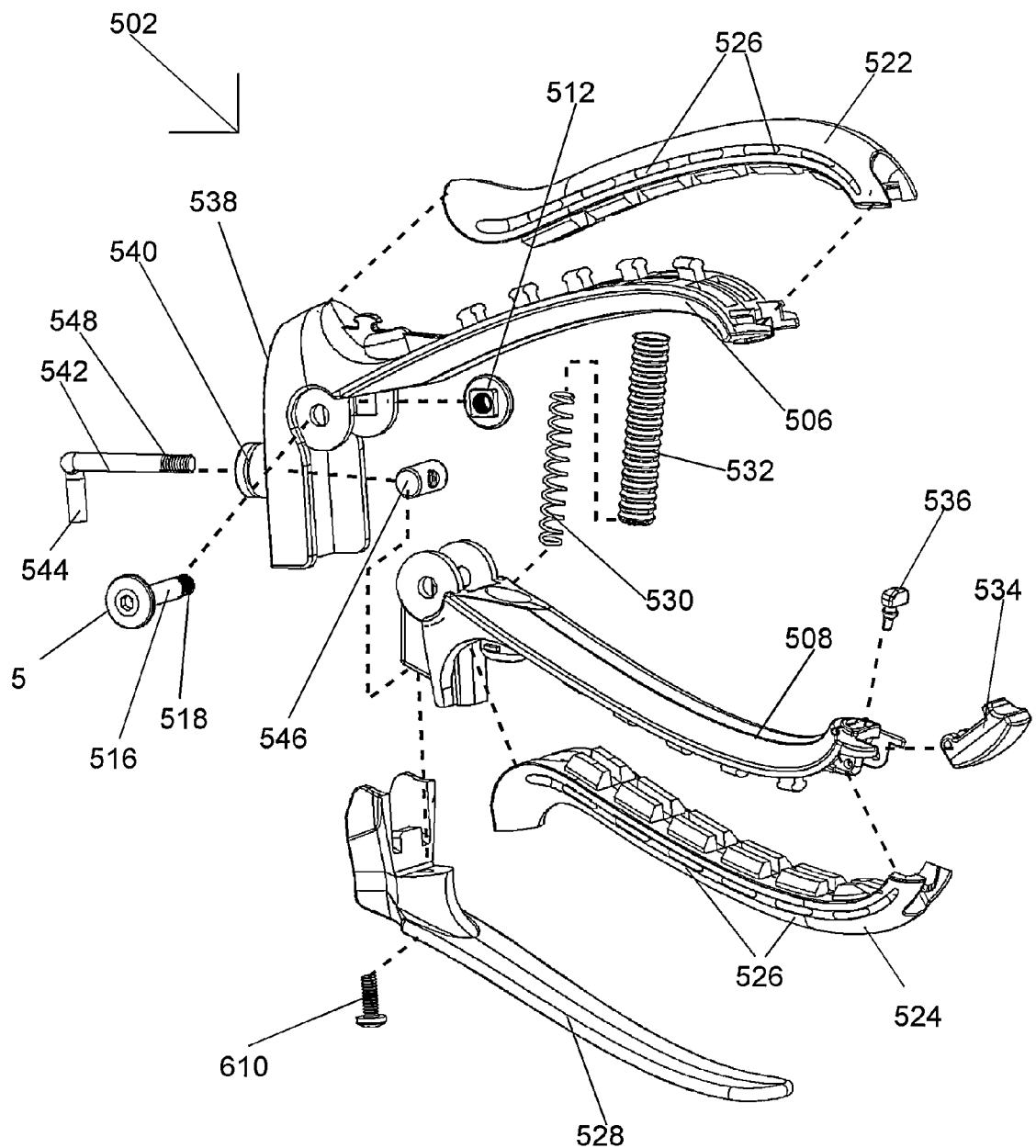
FIG. 39 is an exploded perspective view of the handle assembly of the shears of FIG. 36.

Referring to FIG. 39, handle assembly 502 includes an upper fixed handle 506 and a lower movable handle 508, joined to each other by bolt 510 and nut 512. Bolt 512 has a head 514 with an integral shank, which has a smooth-surfaced cylindrical section 516 between head 514 and a threaded shank end 518. Cylindrical section 518 functions as a bearing or fulcrum for rotational motion of movable handle 508 relative to fixed handle 506. Fixed handle 506 and movable handle 508 have resilient grips 522 and 524, with internal cells 526. A removable, flexible finger guard 528 is attached to movable handle 508 and extends under the grip 524 of movable handle 508, providing a space between guard 528 and grip 524 that fits snugly around a user's fingers to provide a secure hand position while cutting. If a user's fingers are too large to fit comfortably between the grip 524 and the handle 508, the grip can be removed, and the shears can be used without the grip. A spring 530, within an optional spring boot 532, urges the handles apart. Lock mechanism 534 locks the handles together when the shears are not in use. A bumper 536, shown as mounted onto movable handle 508, provides shock absorption when the handles are closed.

Fixed handle 506 has a face 538 (seen best in FIG. 38) with a tubular extension 540 extending toward the blade assembly. A bent rod 542 extends from the interior of movable handle 508, through tubular extension 540 in upper handle 506, with a first end 544 that engages with the blade assembly 504 as described below. Bent rod 542 is held in place in the handles with rod nut 546 at second end 548 and positioned inside movable handle 508. Face 538 also includes a series of depressions 550.

Figure 40:
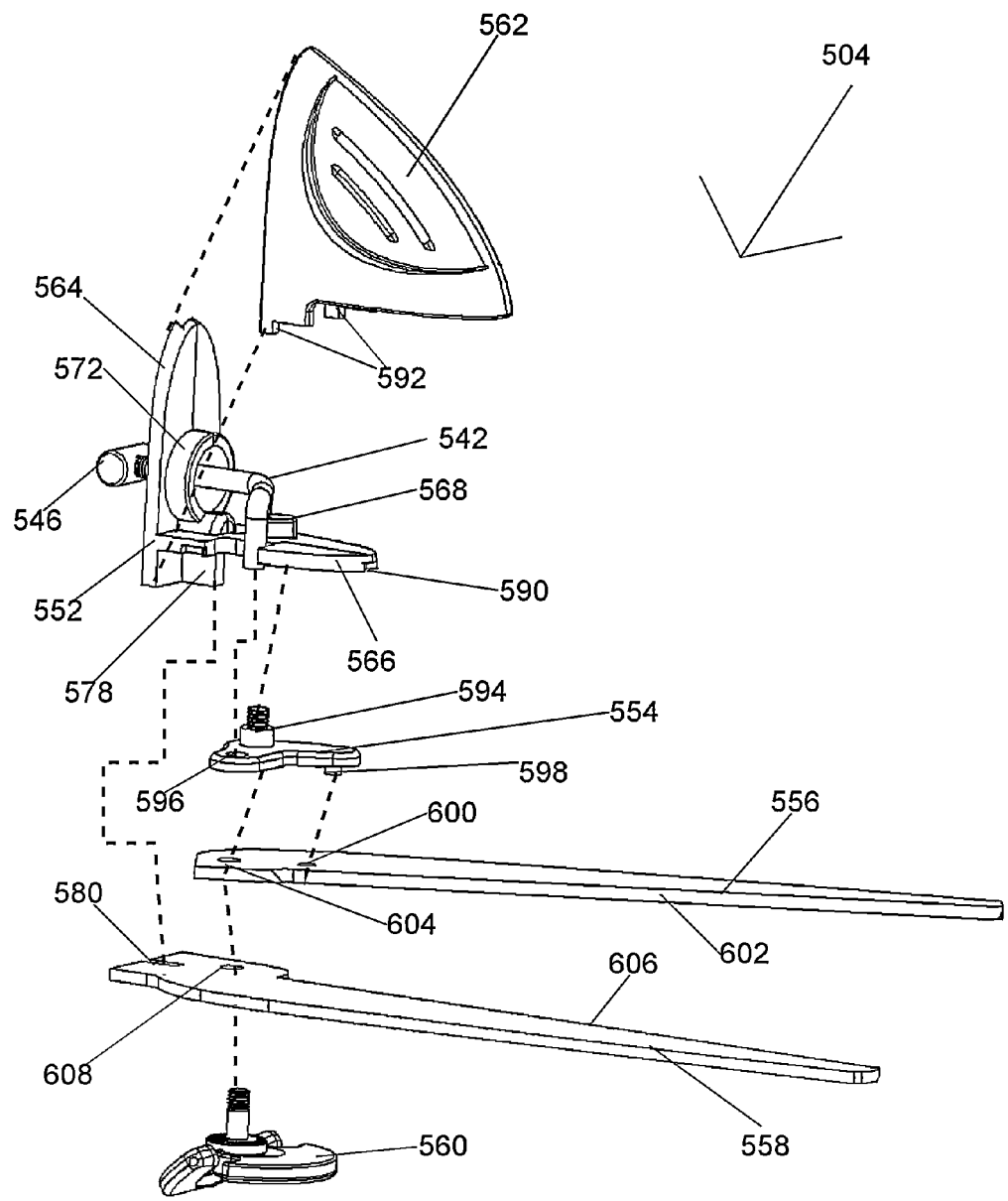
FIG. 40 is an exploded perspective view of the blade assembly of the shears of FIG. 36.
Figure 41:
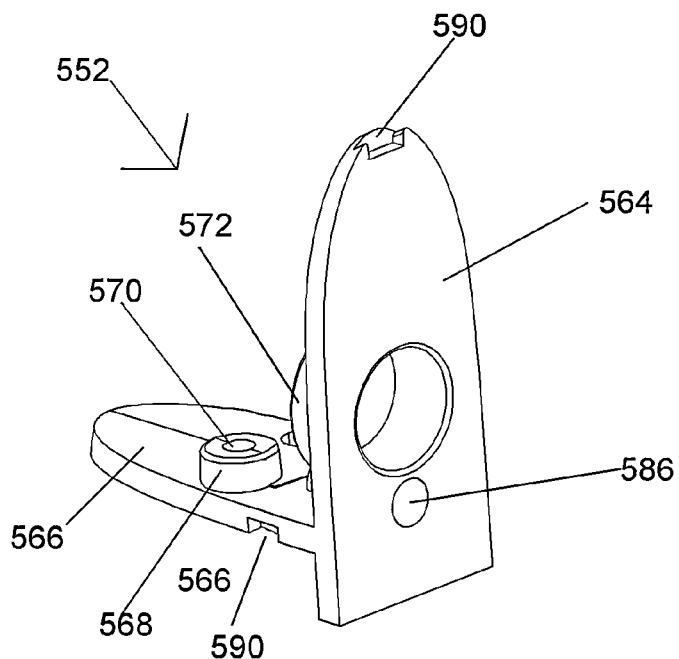
FIG. 41 is a perspective view of the blade chassis of the shears of FIG. 36.
Figure 42:
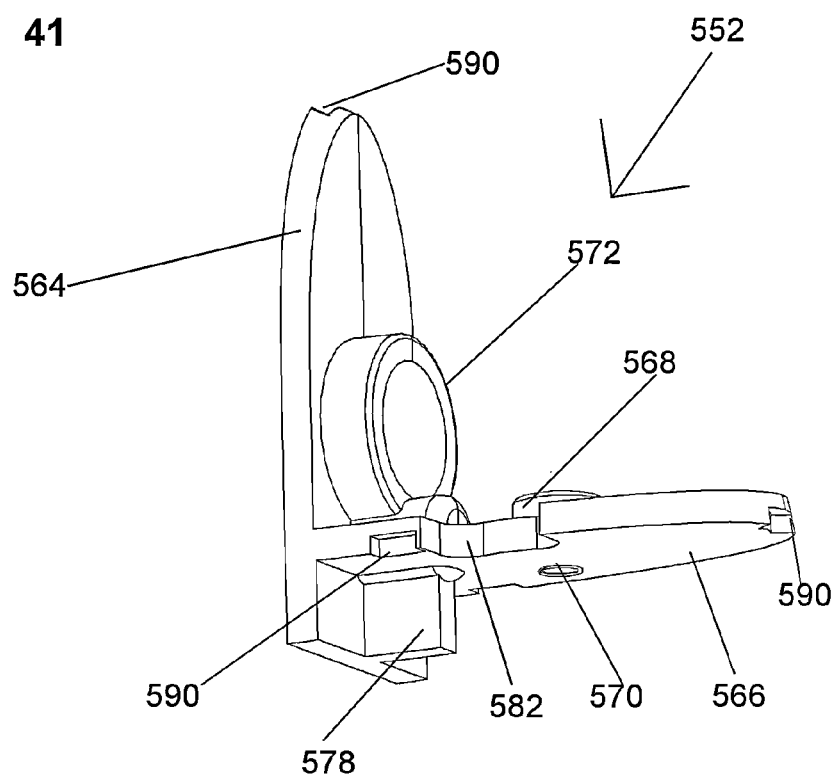
FIG. 42 is another perspective view of the blade chassis of the shears of FIG. 36.

Referring to FIG. 40, blade assembly 504 comprises a blade chassis 552, a key blade 554, a movable cutting blade 556, a fixed cutting blade 558, a D-ring fastener 560, and a nose cover 562. Blade chassis 552 (shown in detail in FIGS. 41 and 42) has a substantially flat plate 564 that is held against face 538 of fixed handle 506, and a substantially perpendicular plate 566 that supports the blades, with integral boss 568 including an internally threaded hole 570 that mates with the threaded end of D-ring fastener 560. A tubular extension 572 protrudes from plate 564 toward the blades, with a cylindrical through hole sized to accommodate tubular extension 540 of fixed handle face 538. Clip 576 (FIG. 38) joins handle assembly 502 to blade assembly 504. Blade chassis 552 also has a key feature 578 that mates with slot 580 of fixed blade 558 and a notch 582 that accommodates the first end 544 of bent rod 542. As shown in FIG. 38, a spring 584 is positioned within hole 586 in plate 564, with a ball bearing 588 partially within hole 576. Notches 590 mate with tabs 592 on nose cover 562.

Referring to FIG. 40, key blade 554 has a tubular projection 594 that extends into boss 568 of chassis 552 and accommodates the shaft of D-ring fastener 560, a hole 596 that accommodates first end 544 of bent rod 542, and a pin 598 that extends into a hole 600 in movable blade 556. Movable cutting blade 556 has a cutting edge 602, hole 600 that engages pin 598 of key blade 554, and a through hole 604 for the shank of D-ring fastener 560. Fixed cutting blade 558 has a cutting edge 606, a through hole 608 to accommodate the shank of D-ring fastener 560, and a slot 580 that mates with key feature 578 of blade chassis 552, locking blade 558 to chassis 552. The shank of D-ring fastener 560 extends through hole 608 in fixed blade 558, hole 600 in movable blade 556, tubular projection 594 in key blade 554, and threads into boss 568 of blade chassis 552.

Assembly of shears 500 can be understood with reference to FIGS. 38, 39, and 40. As shown in FIG. 39, grips 522 and 524 are mounted onto handles 506 and 508, respectively. Bumper 536 and lock mechanism 534 are mounted onto handle 508. Fixed and movable handles 506 and 508 are joined to each other via bolt 510 and nut 512. Rod nut 546 is inserted into movable handle 508 from underneath, and threaded end 548 of bent rod 542 is inserted through tubular extension 540 and screwed into rod nut 546. As shown in FIG. 38, spring 584 and ball 588 are inserted into hole 586 in blade chassis 552, and blade chassis 552 is placed over bent rod 542 and tubular extension 540 of fixed handle 506. Clip 576 is installed to hold blade chassis 552 onto handle assembly 502. Finger security guard 528 is rigidly secured onto movable handle 508, for example with a screw 610 or other suitable fastener. Spring 530 is placed inside spring boot 532, the ends of the boot and spring are compressed toward each other, and the ends of the spring and boot are inserted into receiving openings in the handles 506 and 508.

Figure 43:
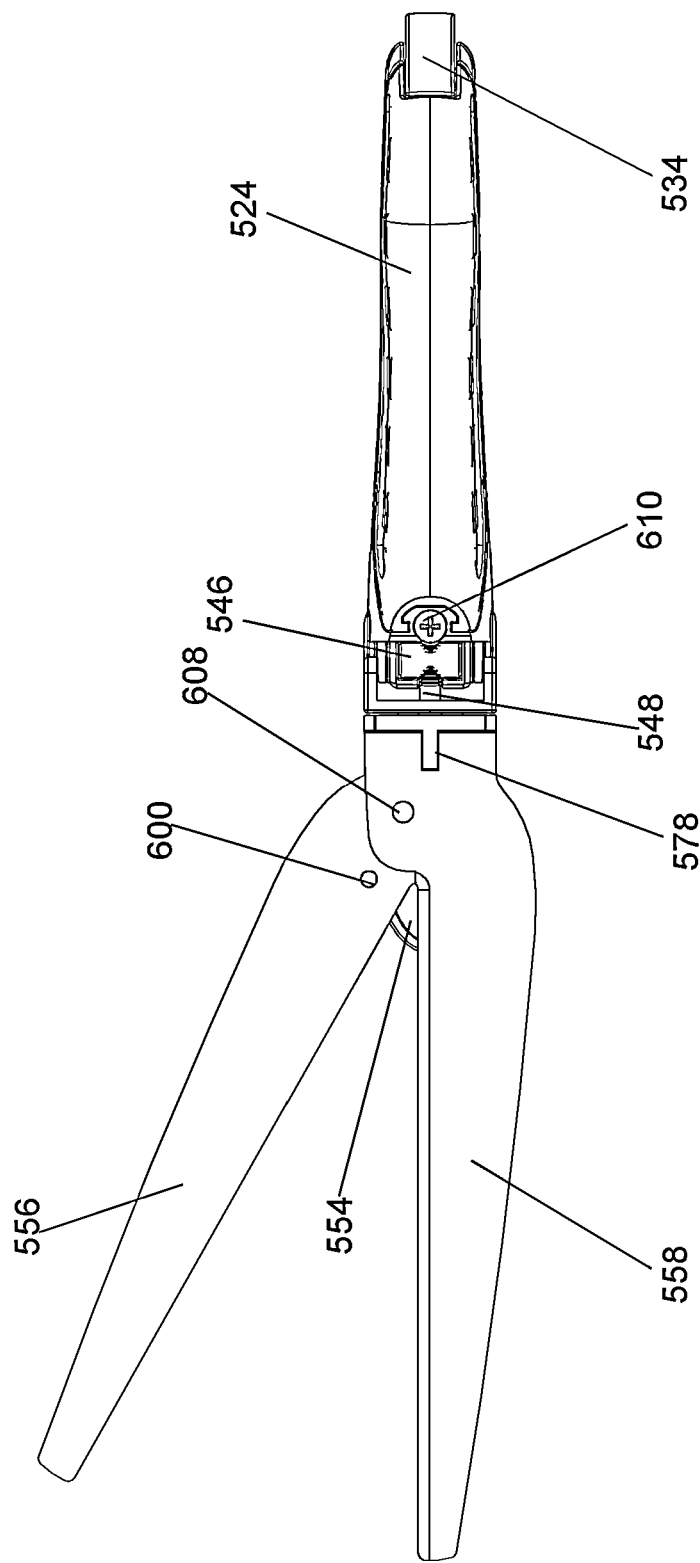
FIG. 43 is a bottom view of the shears of FIG. 36 with the D-ring fastener and finger guard removed.

To install the blades, as shown in FIG. 43, the handles and chassis are turned upside down, with handles 506 and 508 locked together. Key blade 554 is placed onto chassis plate 566, with tubular projection 594 inside boss 568, and rod end 544 inside hole 596. Then movable blade 556 is placed onto key blade 554, with hole 600 around key blade pin 598 and hole 604 lined up with boss 568. Fixed blade 558 is placed onto movable blade 556, with slot 580 mated onto key feature 578 of chassis 552. The shank of D-ring fastener 560 is inserted through holes 610, 600, and 594 and screwed into boss 568 of blade chassis 550. To replace one or both cutting blades, the process of the previous paragraph is reversed.

As shown in FIG. 43, fixed blade 558 is locked to blade chassis via D-ring fastener 560 and the mating of chassis key feature 578 with slot 580. The operation of shears 500 can be understood with reference to FIGS. 44 and 45. When assembled, squeezing movable handle 508 toward fixed handle 506 pulls rod nut 546 and rod 542 away from the blades. Key blade 554 transfers force from the rod 542 to the movable cutting blade 556, causing movable cutting blade to rotate about the shank of D-ring fastener 560. Finger security guard 528 moves with handle 508. The head and handle of D-ring fastener 560 do not protrude far below the lower surfaces of the fixed blade and chassis, and they present a smooth profile at the bottom of the shears to allow close cutting without snagging on obstacles. Blades 556 and 558 are both easily removable and replaceable.

Blade assembly 504, including the blade chassis, blades, D-ring fastener, and nose, is rotatable relative to the handle assembly handles, allowing the blades to be positioned as desired with ball bearing 588 engaged with one of the depressions 550 in the fixed handle face 538. This facilitates an appropriate cutting and prevents strain on muscles, tendons, and joints of the user.

D-Ring Fastener

Figure 46:
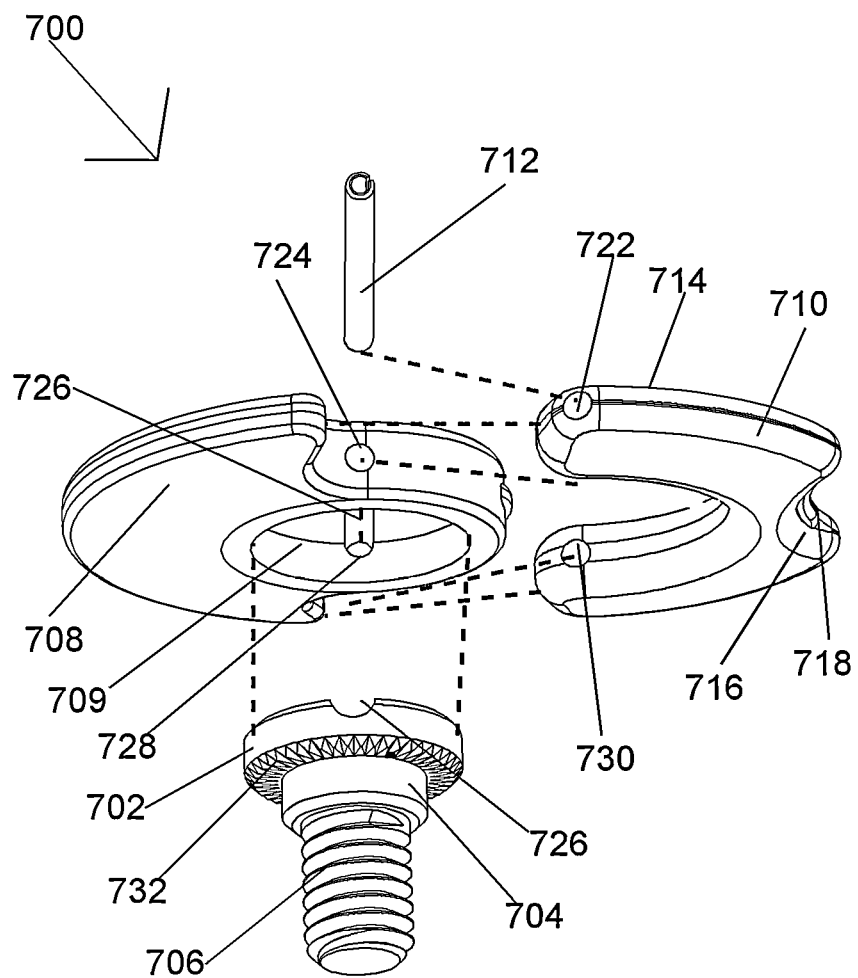
FIG. 46 is an exploded perspective view of a D-ring fastener in accordance with the present invention.

As shown in FIG. 46, the D-ring fastener 700 of the general type used to hold the blades and handles together for any of lopper 200, pruners 300 and 400, and grass or hedge shears 500 has an externally threaded shank formed integrally with a head 702. A cylindrical shank section 704 between the head 702 and the threaded end 706 is not threaded and has a diameter that fits inside through holes in at least one handle or blade of the cutting implement. Head cover 708 fits over and around head 704, with head 704 inside recess 709. A D-ring handle or bail 710 is pivotally attached to head cover 708 with a spring pin 712, such that bail 710 is rotatable between a position where its surface 714 is flush with the outer surface of head cover 708 and a position where it is rotated out of the plane of head cover 708 for use in tightening or loosening D-ring fastener 700. (See bail 266 in FIGS. 17 and 18 for the specific example of the D-ring fastener used for the lopper 200.) A detent on bail 710 (not shown) helps keep bail 710 flush with head cover 708 while the cutting implement is in use. Bail 710 is rotatable through at least a 90 degree angle to a position where it is substantially perpendicular to head cover 708. Head cover 708 and bail 710 should have diameters sufficient to allow a user to grip bail 710 firmly for tightening and loosening D-ring fastener 700. Bail 710 has an indentation 716 and ridge 718 along its edge to aid in rotating the bail about spring pin 712. Optionally, the outer surface of head cover 708 includes a recessed area, shown as feature 394 in FIG. 22 or feature 474 in FIG. 29, into which a logo or other indicator can be placed. Head 702 may include teeth or serrations 732 to aid in keeping D-ring fastener 700 in place against the cutting implement handle.

To assemble D-ring fastener 700, spring pin 712 extends through a hole 722 in bail 710, though hole 724 in head cover 708, along a groove 726 in head cover 708, through a second hole 728 in head cover 708, and into a second hole 730 in bail 710. Head cover 708 is bonded onto head 704 in a suitable manner, such as by spot welding, gluing, or pin insertion. It may be preferable to provide a thicker shank head with a through hole into which pin 712 is inserted. This alternative simplifies manufacturing by eliminating the step of spot welding or gluing.

The D-ring fasteners used in each of the shears have cylindrical and threaded shank portions adapted for the thicknesses of the handle and blades through which the D-ring fastener shank passes. The length and diameter of the cylindrical portion are selected for compatibility with adjacent washer, handle, and/or blade through which the D-ring fastener passes, as well as the nut into which it is screwed. The lengths, diameters, and thread pitch of the threaded shank ends are selected to mate with either nut 220 of lopper 200, nut 344 of shears 300, nut 426 of shears 400, or boss 568 of key blade 554 of shears 500.

Garden Shears

Figure 47:
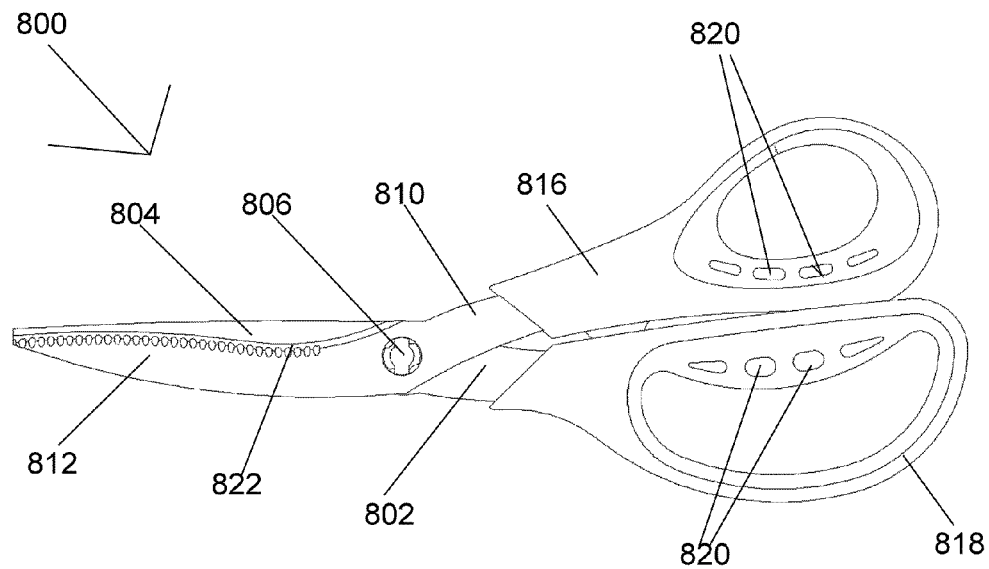
FIG. 47 is a front view of another embodiment of the present invention, a pair of shears.
Figure 48:
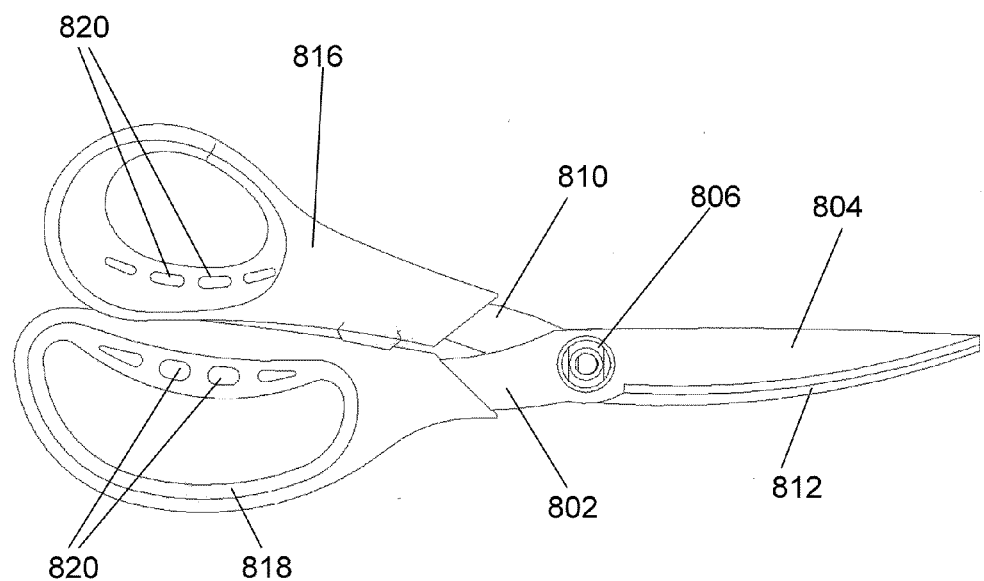
FIG. 48 is a rear view of the shears of FIG. 47.
Figure 49:
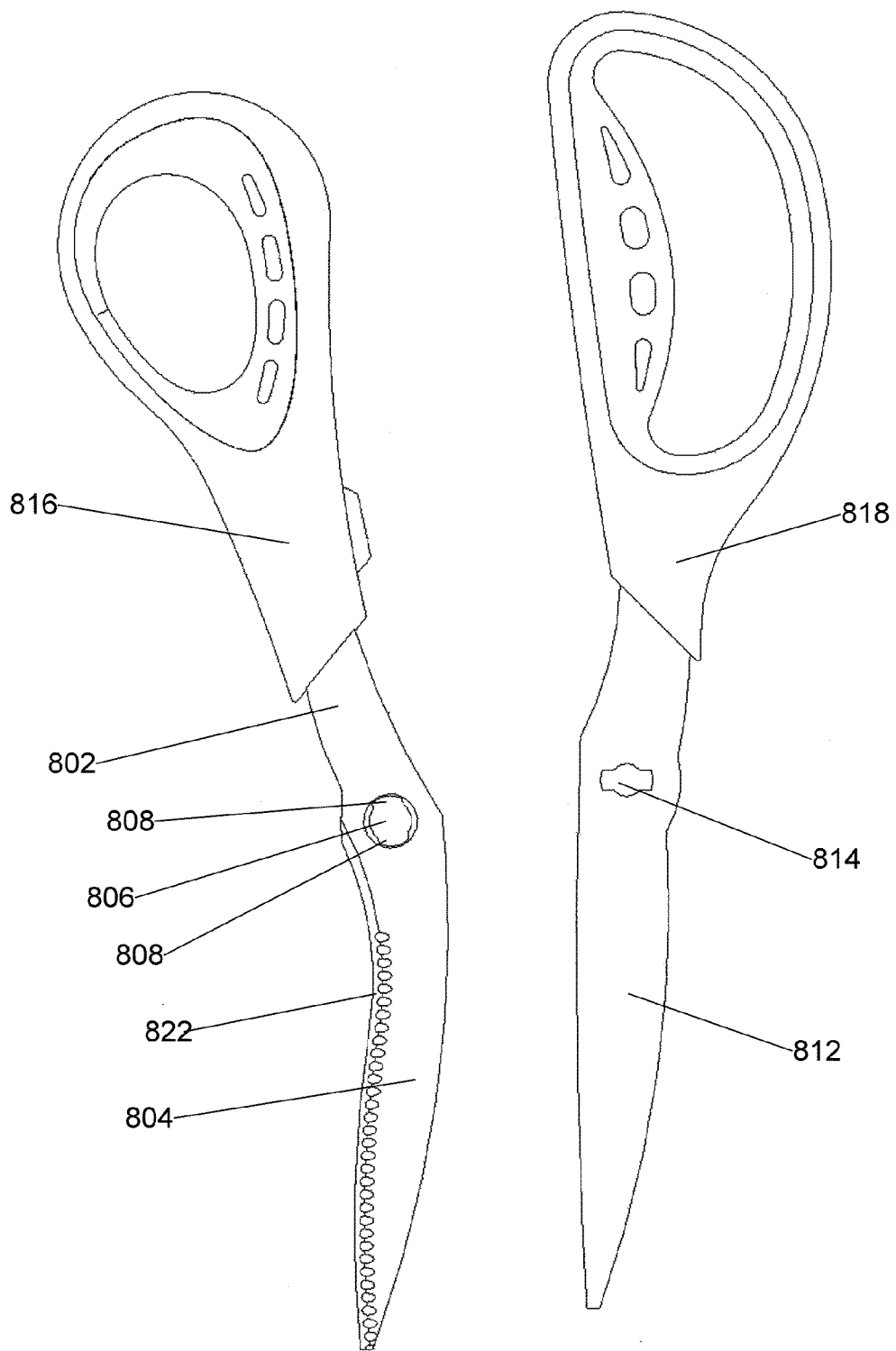
FIG. 49 is a front view of the disassembled blades of the shears of FIG. 47.
Figure 50:
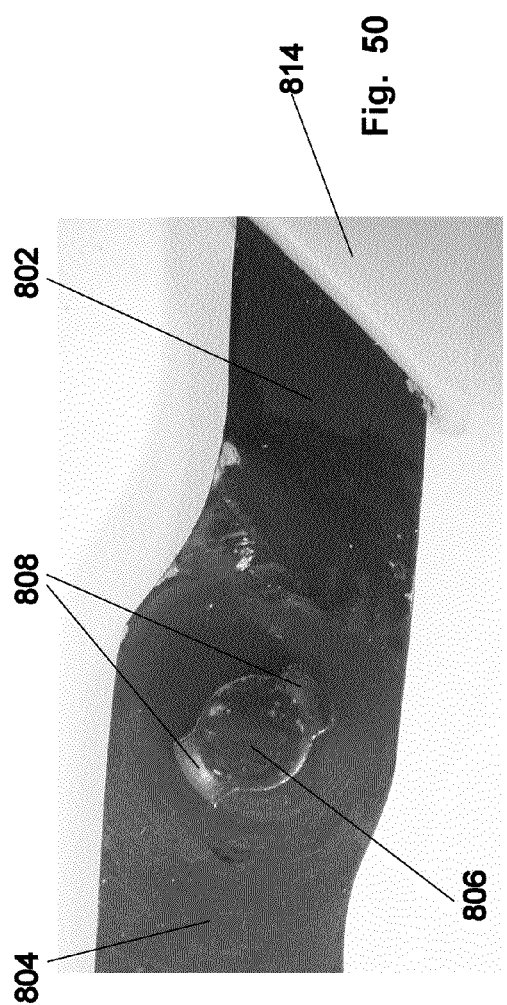
FIG. 50 is an enlarged view showing the fastener of the shears of FIG. 47.
Figure 51:
FIG. 51 is an enlarged view showing the opening that is engaged by the fastener of FIG. 50.

Yet another embodiment of the present invention comprises garden shears 800, shown in FIGS. 47-49. Shears 800 include a first handle 802 with a first integral blade 804 and an integral projecting fastener 806 with wings 808. Second handle 810 and second integral blade 812 have a notched through hole 814 through which fastener 806 extends. The handles 802 and 810 are covered with resilient grips 816 and 818, respectively. The grips 816 and 818 include cells 820. Preferably, the grips are formed from silicone by molding around the handles 802 and 810. The cells 820 may be through holes, or they may comprise a softer material, such as a gel- or air-filled pillow. Second blade 812 includes a serrated portion 822 along its cutting edge.

Shears 800 may be assembled by placing the notched hole 814 of the second handle/blade over the winged fastener 806 with the notches aligned with the wings 808, sliding the second handle/blade over the fastener 806, and then rotating the second handle/blade relative to the first handle/blade to align the handles and blades for use to cut plant material.

The components of the various embodiments can be made in similar manners. The blades can be manufactured by any method known in the art for making blades, such as machining them from a steel sheet and grinding the cutting edges to the desired sharpness. The handles are preferably formed from a suitable plastic or metal by die casting or injection molding. For the lopper, the tangs may be pinned into the handles, or the handles may be insert molded around the tangs. The grips can be formed from a suitable elastomer, such as a thermoplastic elastomer (TPE) or silicone by casting or injection molding. They may be molded around the cells. The cells may be through holes. Alternatively, the cells may be formed from an elastomeric material that is softer than the grips, with the grips insertion molded around the cells or the cells bonded into the grips later. Also, the grips may be snap fitted onto the handles, bonded to the handles such as with glue, or insert molded onto the handles. The washers are preferably formed from spring steel. The D-ring fastener can be formed from steel, preferably by machining, forging, casting, spot welding, and combinations of these processes. The bumpers, other fasteners, lock mechanisms, and bumpers can be formed by processes well known in the art.

The foregoing description is considered as illustrative only of the principles of the invention. Further, since numerous modifications and changes will readily occur to those skilled in the art, it is not desired to limit the invention to the exact construction and process shown and described above. Accordingly, all suitable modifications and equivalents may be resorted to falling within the scope of the invention.

What is claimed is:

1. A fulcrum fastening system for a cutting implement having interchangeable and replaceable blades, said fastening system comprising:
    a bolt having a threaded shank;
    a head integral with said shank;
    a head cover mounted onto said head, said head cover having a smooth exterior surface;
    a bail hingedly attached to said head cover, said bail having a surface, said bail positionable between a first position with said bail surface substantially flush with said exterior surface of said head cover and a gripping position where said bail surface is substantially perpendicular to said exterior surface and said bail is grippable between a user's fingers for rotation of said bolt about an axis extending longitudinally through said shank.

2. The fastening system of claim 1, further comprising a hinge pin extending through holes in said bail and said head cover to join said bail to said head cover.

3. The fastening system of claim 1, wherein said hinge pin extends through a hole in said head to join said head cover and bail to said head.

4. The fastening system of claim 1, further comprising a nut, said nut comprising a head having a smooth exterior surface and an internally threaded nut shank having a first portion with a polygonal cross section and a second portion with a round cross section;
    wherein:
        said internally threaded nut shank is matable with said threaded end of said bolt shank;
        said polygonal portion of said nut shank is lockable with a handle and blade of the cutting implement; and
        said round portion of said nut shank provides a fulcrum for rotation of a second handle and blade of the cutting implement.

5. The fastening system of claim 4, wherein said bolt head cover and said nut head are formed to provide smooth exterior surfaces when said nut is joined to said bolt.

6. A cutting implement comprising:
    first and second handles, wherein:
        at least one cushioned grip is secured onto each handle, said grip formed from a resilient material and at least partially enclosing cells containing a softer material;
        each handle comprises a blade securing portion at one end, with each blade securing portion having an interior surface facing toward the other of said blade securing portions and an exterior surface facing away from the other of said blade securing portions;
    two blades, each blade attached to one of said handles, wherein at least one of said blades is removable and replaceable; and
    means for retaining and releasing at least one of said blades, said means for retaining and releasing said blade comprising:
        a bolt having a threaded shank and a head with a hingedly attached bail, said bail positionable between a first position in contact with a flat surface on said head and a gripping position where said bail is grippable between a user's fingers, said bolt head positioned against said outside surface of one of said handle ends; and
        a nut mated with said bolt and positioned against said outside surface of the other of said handles;
    wherein:
        said means for retaining is pivotable with application of force by a user's fingers and grippable by a user's fingers for removing and replacing said blade without tools;
        said means for retaining has a narrow, smooth profile substantially parallel to said blade;
        said means for retaining has a narrow, smooth profile substantially parallel to said blade and secures said blade between said handles; and
        a cutting plane is defined between said blades.

7. The cutting implement of claim 6, wherein said grip is formed from a material selected from thermoplastic elastomers, silicone, and combinations thereof.

8. The cutting implement of claim 6, wherein said softer material in said cells comprises a material selected from clear elastomers, gels, air, and combinations thereof.

9. The cutting implement of claim 6, wherein at least one of said blades is removably and replaceably locked to said interior surface of one of said handles by a plurality of interlocking tabs and notches.

10. The cutting implement of claim 6, wherein said cutting implement is selected from pruners, loppers, and garden shears.

11. The cutting implement of claim 6, wherein said bolt comprises:
    a head with an integral shank, said shank having a threaded end and a smooth-surfaced portion between said head and said threaded end;
    a head cover mounted onto said head, said head cover having a substantially smooth and flat exterior surface;
    a bail handle attached to said head cover and said head with a hinge, said handle having an exterior surface and rotatable about said hinge between a first position with its exterior surface substantially coplanar with said exterior surface of said head cover and a second position with its exterior surface substantially perpendicular to said exterior surface of said head cover;

wherein said handle is sized for easy gripping between a user's thumb and fingers when in said second position.

12. The cutting implement of claim 6, wherein:
said mated bolt and nut have a length defined between an outside surface of said bolt head and an outside surface of said nut; and
said cutting plane divides said length into two unequal distances.

13. The cutting implement of claim 6, wherein:
each of said handles has a blade securing portion at one end, said blade securing portion having an interior surface adjacent said blade and an exterior surface facing away from said blade; and
said cutting implement comprises two cooperating blades sandwiched between said blade securing portions of said handles, with a cutting plane defined between said two blades, with each blade having interlocking key features that mate with complementary key features on said interior surface of said adjacent handle end to prevent rotational motion of each blade relative to said adjacent handle;
at least one of said bolt and said nut, when mated to retain said handle ends and blades, passes through holes extending through said handles and blades;
said mated bolt and nut have a length defined between an outside surface of said bolt head and an outside surface of said nut; and
said cutting plane divides said length into two unequal distances.

14. The cutting implement of claim 13, further comprising means for detecting a state of wear of said blades and for determining whether a branch to be cut has a diameter suitable for said cutting implement.

15. The cutting implement of claim 14, wherein:
said means for detecting wear and branch size suitability comprises projections extending toward each other from said handles and defining a rounded gap between said projections when said handles are closed, the gap having a diameter;
wherein:
said cutting implement is designed to cut branches having branch diameters substantially equal to or less than the gap diameter with the handles closed when said cutting implement is in a first state of wear; and
said cutting implement is in a second state of wear sufficient to require blade replacement or sharpening when said cutting implement cannot cut a branch having a diameter substantially equal to the gap diameter.

16. The cutting implement of claim 13, wherein one of said blades includes a notch for cutting objects selected from wires and ties.

17. The cutting implement of claim 13, further comprising a lock mechanism for locking said handles and blades in a closed position.

18. The cutting implement of claim 17, wherein said lock mechanism is biased in an unlocked position.

19. The cutting implement of claim 13, further comprising a spring for biasing said handles and blades in an open position.

20. The cutting implement of claim 6, wherein a first blade is integral with a first blade securing portion of said first handle, and a second blade is sandwiched between said first blade and a second blade securing portion of said second handle.

21. The cutting implement of claim 20, wherein:
said cutting implement further comprises a washer having a plate sandwiched between said nut and an outer surface of said second blade securing portion, said washer having prongs extending through openings in said second blade securing portion and said second blade; and
said bolt head is positioned against an outside surface of said first blade securing portion.

22. The cutting implement of claim 20, wherein:
said first blade has an exterior surface and an interior surface;
said second blade is removable and replaceable, has interlockable key features, and has interior and exterior surfaces,
said cutting plane is defined between said interior surfaces of said first and second blades;
said blade securing portion of said second handle has interlockable key features aligned with said key features on said second blade;
said bolt extends through holes in said first blade, said second blade, and said second blade securing portion; and
said means for retaining further comprises a lock washer having prongs extending from said exterior surface of said blade securing portion of said second handle into said aligned interlockable key features of said second blade securing portion and said second blade;
said bail has an exterior surface and is rotatable about a hinge between a first position with its exterior surface substantially parallel to said exterior surface of said first blade retaining portion and a second position with its exterior surface substantially perpendicular to said exterior surface of said first blade securing portion, said bail sized for gripping between a user's fingers for removing and replacing said blade without tools.

23. The cutting implement of claim 22, wherein:
said nut comprises:
a head having an exterior surface substantially flush with said exterior surface of said second blade securing portion; and
an internally threaded nut shank having a first portion with a polygonal cross section and a second portion with a round cross section;
said washer, said second blade securing portion and said second blade include polygonal through holes dimensioned to lock around said polygonal portion of said nut shank; and
said first blade includes a round through holes dimensioned to rotate about said cylindrical portion of said nut shank.

24. The cutting implement of claim 22, further comprising projections extending toward each other from said handles and defining a rounded gap between said projections when said handles are closed, the gap having a diameter; and
wherein:
said cutting implement is designed to cut branches having branch diameters substantially equal to or less than the gap diameter a with the handles closed when said cutting implement is in a first state of wear; and
said cutting implement is in a second state of wear sufficient to require blade replacement or sharpening when said cutting implement cannot cut a branch having a diameter substantially equal to the gap diameter.

25. The cutting implement of claim 22, wherein one of said blades includes a notch for cutting objects selected from wires and ties.

26. The cutting implement of claim 22, further comprising a lock mechanism for locking said handles and blades in a closed position.

27. The cutting implement of claim 26, wherein said lock mechanism is biased in an unlocked position.

28. The cutting implement of claim 22, further comprising a spring for biasing said handles and blades in an open position.

29. The cutting implement of claim 6, wherein:
said cutting implement is selected from grass shears and hedge shears;
said handles are a fixed handle and a movable handle joined at a first pivot joint;
said blades comprise a fixed blade and a movable blade;
said means for retaining and releasing further comprises a blade chassis having an integral internally threaded boss into which said bolt shank is screwed, wherein said boss replaces said nut of said means for retaining and releasing;
said cutting implement comprises:
a handle assembly, comprising said fixed handle, said movable handle joined to said fixed handle at said first pivot joint, a bent rod, and a nut within said movable handle engageable with a threaded end of said rod, wherein said movable handle is movable in a first plane about said first pivot joint relative to said fixed handle; and
a blade assembly, comprising said blade chassis, a key blade locked to said movable blade, said fixed blade locked to said chassis, and said bolt, with said bolt shank passing through openings in said blades and forming, with said threaded boss, a second pivot joint for motion of said movable blade relative to said fixed blade with a cutting plane defined between said movable and fixed blades;
said bent rod extends from said handle assembly and engages with said key blade to move said movable blade about said second pivot joint when said movable handle is pivoted about said first pivot joint; and
said blade chassis is joined to said handle assembly at a third pivot joint, with said blade assembly rotatable about said third pivot joint to change the angle between said first plane and said cutting plane.

30. The shears of claim 29, further comprising:
a spring that biases said handles in an open position; and
a lock mechanism to lock said handles and said blades in a closed position.

31. The shears of claim 29, further comprising a flexible, removable finger security device attached to said movable handle.

32. The shears of claim 29, further comprising a nose cover mounted over said chassis and said rod.

33. The shears of claim 29, wherein:
said fixed handle comprises a substantially planar face adjacent said blade chassis, said handle face including a series of depressions spaced along an arc;
said blade chassis comprises a substantially planar face positioned against said handle face and including a projection that interfaces with said depressions as said blade chassis rotates relative to said handle assembly about said third pivot joint.

34. The cutting implement of claim 29, wherein:
said bent rod has a first threaded end and a second end,
said nut is within said movable handle and engageable with said first threaded end of said rod, wherein said movable handle is rotated in a first plane about said first pivot joint relative to said fixed handle; and said blade chassis has an integral internally threaded boss;
said key blade is adjacent to said blade chassis;
said movable blade is locked to said key blade;
said fixed blade is locked to said chassis;
said bolt has a head with a narrow, smooth profile substantially parallel to an exterior surface of said movable blade; a shank fixed to and extending from said head and passing through openings in said blades, said shank having a threaded end mated with said boss of said chassis, with said bail rotatable with application of force by a user's fingers and grippable by a user's fingers for removing and replacing said bolt from said nut to remove and replace said movable and fixed blades without tools;
said rod extends from said handle assembly and engages with said key blade to rotate said movable blade about said second pivot joint when said movable handle is rotated about said first pivot joint;
said bolt forms, with said threaded boss, a second pivot joint for motion of said movable blade relative to said fixed blade with a cutting plane defined between said movable and fixed blades;
said bolt provides a fulcrum for relative rotational motion of said movable blade relative to said fixed blade; and
said blade chassis is joined to said handle assembly at a third pivot joint, with said blade assembly rotatable about said third pivot joint to change the angle between said first plane and said cutting plane.

35. A cutting implement comprising:
a handle portion with a cushioned grip secured onto said handle portion, said grip formed from a resilient material and at least partially enclosing cells containing a softer material;
a removable and replaceable blade, said blade being substantially planar and having a non-cutting portion formed for retention along an axial plane within said handle portion and a hole passing through said non-cutting portion; and
means for retaining and releasing said blade, said means for retaining comprising a locking pin attached to a paddle, said paddle attached to said handle portion via at least one hinge and pivotable about said hinge between a lockable position for retaining said blade and a release position wherein said blade is released and removable from said handle;
wherein:
said paddle urges said locking pin into the opening in said blade when in said lockable position, and said paddle pulls said locking pin out of the opening in said blade when in said release position;
said means for retaining and releasing is pivotable with application of force by a user's fingers and grippable by a user's fingers for removing and replacing said blade without tools; and
said means for retaining has a narrow, smooth profile substantially parallel to said blade.

36. The saw of claim 35, comprising paired handle portions mated along said axial plane.

37. The saw of claim 35, further comprising a lock mechanism engageable with said paddle and operative to lock said paddle in said lockable position.

38. The cutting implement of claim 35, wherein:
said handle portion comprises a longitudinal axial plane;
said paddle is attached to one side of said handle portion in an orientation substantially parallel to said axial plane; and said paddle is substantially parallel to said axial plane in said lockable position and substantially perpendicular to said axial plain in said release position.

39. The cutting implement of claim 38, wherein said grip is formed from a material selected from thermoplastic elastomers, silicone, and combinations thereof.

40. The cutting implement of claim 38, wherein said softer material in said cells comprises a material selected from clear elastomers, gels, air, and combinations thereof.

41. A thickness and wear gauge for a cutting implement having a first blade secured to a first handle and a second blade secured to a second handle, with said blade and handle combinations pivotable about a fulcrum between a closed position and an open position, said gauge comprising:
projections extending toward each other from said handles and defining a rounded gap between said projections when said handles are in said closed position, the gap having a diameter;
wherein:
said cutting implement is designed to cut objects having object diameters substantially equal to or less than the gap diameter with the handles in said closed position when said cutting implement is in a first state of wear; and
said cutting implement is in a second state of wear sufficient to require blade replacement or sharpening when said cutting implement cannot cut an object having a diameter substantially equal to the gap diameter.

42. A cutting implement, comprising:
a first removable and replaceable blade having interlockable key features;
a second removable and replaceable blade that cooperates with said first blade with a cutting plane defined between said two blades, said second blade having interlockable key features;
a first handle, having a first blade securing portion at one end, said first blade securing portion having an interior surface adjacent said first blade and an exterior surface facing away from said first blade, said first blade securing portion having interlockable key features that complement said key features on said first blade;
a second handle, having a second blade securing portion at one end, said second blade securing portion having an interior surface adjacent said second blade and an exterior surface facing away from said first blade, said second blade securing portion having interlockable key features that complement said key features on said first blade; and
fulcrum means extending through said first blade securing portion, said first blade, said second blade, and said second blade securing portion;
wherein:
said fulcrum means has a narrow, smooth profile substantially parallel to said exterior surface of said first blade securing portion and a bail handle having an exterior surface and rotatable about a hinge between a first position with its exterior surface substantially parallel to said exterior surface of said first blade retaining portion and a second position with its exterior surface substantially perpendicular to said exterior surface of said first blade securing portion, said bail handle sized for gripping between a user's fingers for removing and replacing said blade without tools;
said fulcrum means has a second exterior surface substantially flush with said exterior surface of said second blade securing portion;
said interlocking key features of said first blade and said first blade securing portion lock said first blade to said first handle for rotational motion about said fulcrum means; and
said interlocking key features of said second blade and said second blade securing portion lock said second blade to said fulcrum means.

43. The cutting implement of claim 42, wherein:
said fulcrum means comprises a nut and a bolt;
wherein at least one of said bolt and said nut, when mated to retain said handle ends and blades, passes through holes extending through said blade retaining portions and blades;
said fulcrum means has a length defined between its exterior surfaces; and
said cutting plane divides said length into two unequal distances.

44. The cutting implement of claim 42, wherein:
said fulcrum means comprises a nut and a bolt;
said bolt comprises:
a head having a handle grippable by a user's fingers for rotational motion selected from screwing said bolt into said nut and unscrewing said bolt from said nut; and
a threaded bolt shank mateable with said nut; and
a cylindrical portion between said head and said shank;
said nut comprises:
a head having an exterior surface substantially flush with said exterior surface of said second blade securing portion;
an internally threaded nut shank having a first portion with a polygonal cross section and a second portion with a round cross section;
said second handle portion and said second blade include polygonal through holes dimensioned to lock around said polygonal portion of said nut shank; and
said first handle portion and said first blade include round through holes dimensioned to rotate about said cylindrical portion of said nut shank.

45. The cutting implement of claim 42, wherein:
each of said handles has a grip formed from a material selected from thermoplastic elastomers, silicone, and combinations thereof, said grip including cells containing a softer material.

46. The cutting implement of claim 42, wherein said softer material in said cells comprises a material selected from clear elastomers, gels, air, and combinations thereof.

47. The cutting implement of claim 42, further comprising projections extending toward each other from said handles and defining a rounded gap between said projections when said handles are closed, the gap having a diameter; and
wherein:
said cutting implement is designed to cut branches having branch diameters substantially equal to or less than the gap diameter a with the handles closed when said cutting implement is in a first state of wear; and
said cutting implement is in a second state of wear sufficient to require blade replacement or sharpening when said cutting implement cannot cut a branch having a diameter substantially equal to the gap diameter.

48. The cutting implement of claim 42, wherein one of said blades includes a notch for cutting objects selected from wires and ties.

49. The cutting implement of claim 42, further comprising a lock mechanism for locking said handles and blades in a closed position.

50. The cutting implement of claim 49, wherein said lock mechanism is biased in an unlocked position.

51. The cutting implement of claim 42, further comprising a spring for biasing said handles and blades in an open position.

52. The cutting implement of claim 22, wherein:
said means for retaining and releasing has a length defined between its exterior surfaces; and
said cutting plane divides said length into two unequal distances.

* * * * *